(12) United States Patent
Burger et al.

(10) Patent No.: US 7,885,272 B2
(45) Date of Patent: Feb. 8, 2011

(54) REMOTE CONTROL OF DEVICE BY TELEPHONE OR OTHER COMMUNICATION DEVICES

(75) Inventors: Eric W. Burger, Amherst, NH (US); Ophir Frieder, Chicago, IL (US)

(73) Assignee: Dialogic Corporation, Montreal, Quebec (CA)

( * ) Notice: Subject to any disclaimer, the term of this patent is extended or adjusted under 35 U.S.C. 154(b) by 705 days.

(21) Appl. No.: 11/258,575

(22) Filed: Oct. 25, 2005

(65) Prior Publication Data

US 2006/0039389 A1 Feb. 23, 2006

Related U.S. Application Data

(63) Continuation-in-part of application No. 10/785,501, filed on Feb. 24, 2004, now Pat. No. 7,406,696.

(51) Int. Cl.
*H04L 12/28* (2006.01)
*H04M 3/00* (2006.01)
*H04M 11/10* (2006.01)

(52) U.S. Cl. .................. 370/401; 455/420; 379/102.03; 379/102.05; 379/102.06

(58) Field of Classification Search ................. 370/401; 379/102.01–102.03, 102.05; 455/418–420
See application file for complete search history.

(56) References Cited

U.S. PATENT DOCUMENTS

| | | |
|---|---|---|
| 4,785,408 A | 11/1988 | Britton et al. |
| 5,029,199 A | 7/1991 | Jones et al. |

(Continued)

FOREIGN PATENT DOCUMENTS

WO WO02/32075 4/2002

OTHER PUBLICATIONS

Burger, E. W., "Keypad Markup Language (KPML)," IETF, Internet Draft draft-burger- sipping-kpml-00.txt, Oct. 28, 2002.*

(Continued)

*Primary Examiner*—Daniel J Ryman
*Assistant Examiner*—Thinh D Tran
(74) *Attorney, Agent, or Firm*—Weingarten, Schurgin, Gagnebin & Lebovici LLP

(57) ABSTRACT

A communication device, such as a telephone or a personal computer, controls one or more remotely controlled devices solely over a signaling path, without necessarily establishing an audio path, thus eliminating the need for the remotely controlled device, or its controller, to include DTMF detection hardware or software or an RTP stack. The communication device can include authentication information, which the communication device uses to authenticate itself to the remotely controlled device, so a user of the communication device can remotely control the device without necessarily entering additional authentication information, such as a passcode. The remotely controlled device (or a controller that controls the device) can register with an element that detects user interactions, such as keypad button presses, with the communication device. The registration can identify one or more patterns of user input. If the element detects the specified pattern of user input in a user interaction with the communication device, the element notifies the remotely controlled device (or the controller). Optionally, other application servers can also register with the element to be notified if the user enters the same or a different pattern of input in a user interaction with the communication device.

50 Claims, 5 Drawing Sheets

U.S. PATENT DOCUMENTS

| | | | | |
|---|---|---|---|---|
| 5,384,829 | A | | 1/1995 | Heileman et al. |
| 5,838,682 | A | * | 11/1998 | Dekelbaum et al. ......... 370/401 |
| 6,098,094 | A | | 8/2000 | Barnhouse et al. |
| 6,144,848 | A | | 11/2000 | Walsh et al. ................ 455/419 |
| 6,188,760 | B1 | | 2/2001 | Oran et al. |
| 6,411,705 | B2 | | 6/2002 | Oran et al. |
| 6,424,660 | B2 | * | 7/2002 | Jacobson, Jr. ............... 370/475 |
| 6,681,110 | B1 | * | 1/2004 | Crookham et al. .......... 455/420 |
| 6,744,865 | B2 | | 6/2004 | Lahutsky ............... 379/102.01 |
| 6,819,315 | B2 | | 11/2004 | Toepke et al. |
| 6,854,660 | B2 | * | 2/2005 | Yoon et al. .................... 236/51 |
| 6,856,612 | B1 | * | 2/2005 | Bjelland et al. ............. 370/338 |
| 6,970,539 | B2 | * | 11/2005 | Yamamoto et al. ...... 379/102.05 |
| 7,024,461 | B1 | * | 4/2006 | Janning et al. ............... 709/207 |
| 7,092,500 | B2 | * | 8/2006 | Creamer et al. ........ 379/102.01 |
| 7,257,576 | B2 | * | 8/2007 | Eminovici ..................... 707/6 |
| 7,324,528 | B2 | * | 1/2008 | Szlam ........................ 370/401 |
| 2001/0040886 | A1 | * | 11/2001 | Jimenez et al. ............. 370/352 |
| 2002/0131569 | A1 | * | 9/2002 | Ito et al. ................ 379/102.03 |
| 2002/0181398 | A1 | * | 12/2002 | Szlam ........................ 370/230 |
| 2002/0188744 | A1 | | 12/2002 | Mani |
| 2002/0191557 | A1 | * | 12/2002 | Chow et al. .................. 370/329 |
| 2003/0185358 | A1 | * | 10/2003 | Sakamoto .............. 379/102.01 |
| 2003/0210694 | A1 | | 11/2003 | Jayaaman et al. |
| 2004/0235463 | A1 | | 11/2004 | Patel .......................... 455/418 |
| 2004/0255162 | A1 | * | 12/2004 | Kim et al. ................... 713/201 |
| 2005/0083912 | A1 | | 4/2005 | Afshar et al. |
| 2006/0039389 | A1 | * | 2/2006 | Burger et al. ............... 370/401 |

OTHER PUBLICATIONS

SMS-Enabled Chocolate Vending Machine, http://www.textually.org/textually/archives/2003/08/001334.htm Aug. 8, 2003.

SymSoft, The Nobill® USSD Gateway http://www.symsoft.se/print/php?ID-2235 pp. 1-3 (Oct. 21, 2005).

Clickatell Mobile Messaging, SMS in Micropayments, "Buying ice-cream by SMS" (Dec. 18, 2003), http://www.clickatell.com/brochure/sms_industry/micropayments.php pp. 1-3 (Jun. 17, 2004).

i-mode FAQ, http://www.eurotechnology.com/imode/faq-cmode.html pp. 1-4 (1996-2004).

Alibaba.com, http://www.alibaba.com/manufacturer/13198051/Sell_SMS_Vending_Controller.html pp. 1-3 (Oct. 10, 2005).

Smith, "m-Travel.com and Travel Distribution News," http://www.m-travel.com/news/2001/09/cocacola_docomo.html; pp. 1-5 (Sep. 4, 2001).

SOPRANO and Ultra-Pacific bring usability to mobile phone commerce with new wireless technology, http://www.soprano.com.au/newsItem.asp?newsID=15, pp. 1-3 (Aug. 31, 2001).

Jennings, et al, NeuStar, Inc. Private Extensions to the Session Initiation Protocol (SIP) for Asserted Identity within Trusted Networks, pp. 1-18 (Nov. 2002).

U.S. Appl. No. 60/511,7136, filed Oct. 16, 2003, Afshar.

Andreassen, F. and Foster, B., "Media Gateway Control Protocol (MGCP) Version 1.0,"IETF, RFC 3435, Jan. 2003.

Ayars, J., Bulterman, D., Cohen, A., Day, K., Hodge, E., Hoschka, P., Hyche, E., Jourdan, M., Kim, M., Kubota, K., Lanphier, R., Layaida, N., Michel, T., Newman, D., Ossenbruggen, J. v., Rutledge, L., Saccocio, B., Schmitz, P., and ten Kate, W., "Synchronized Multimedia Integration Language (SMIL 2.0) Specification," W3C, W3C Recommendation.

Bharatia, V., Cave, E., and Culpepper, B., "SIP INFO Method for Event Reporting," IETF, Expired Internet Draft draft-culpepper-sip-info-event-00.txt, Apr. 18, 2000.

Bompani, L., Ciancarini, P., and Vitali, F., "Software Engineering and the Internet: a roadmap," presented at Proceedings of the Conference on the Future of Software Engineering, 2000.

Bray, T., Paoli, J., Sperberg-McQueen, C. M., and Maler, E., "Extensible Markup Language (XML) 1.0 (Second Edition)," W3C, W3C Recommendation Oct. 6, 2000.

Burger, E. W., "Keypad Markup Language (KPML)," IETF, Internet Draft draft-burger-sipping-kpml-00.txt, Oct. 28, 2002.

Burger, E. W., "Keypad Markup Language (KPML)," IETF, Internet Draft draft-burger-sipping-kpml-01, Mar. 3, 2003.

Burger, E. W., "Keypad Markup Language (KPML)," IETF, Internet Draft draft-burger-sipping-kpml-02, Jun. 30, 2003.

Burger, E. W, "Keypad Stimulus Protocol (KPML)," IETF, Internet Draft draft-ietf-sipping-kpml-00, Sep. 1, 2003.

Burger, E. W. and Dolly, M., "Keypad Stimulus Protocol (KPML)," IETF, Internet Draft draft-ietf-sipping-kpml-01, Oct. 26, 2003.

Burger, E. W. and Dolly, M., "Keypad Stimulus Protocol (KPML)," IETF, Internet Draft draft-ietf-sipping-kpml-02, Feb. 2, 2004.

Cisco Systems, CISCO IOS Software Releases 12.2 SIP INFO Method for DTMF Tone Generation, http://www.cisco.com/en/US/products/sw/iosswrel/ps1839/products_feature_guide09186..., Dec. 22, 2003.

Donovan, S., "The SIP INFO Method," IETF, Standards Track RFC2976, Oct. 2000.

Fourer, R., "Modeling Languages Versus Matrix Generators for Linear Programming," *ACM Transactions on Mathematical Software (TOMS)*, vol. 9, pp. 143-183, 1983.

Gauthier, R. and Stephen, P., *Designing Systems Programs*. Englewood Cliffs, NJ: Prentice-Hall, 1970.

Goose, S., Kodlahalli, S., Pechter, W., and Hjelsvold, R., "Streaming Speech: A Framework for Generating and Streaming 3D Text-To-Speech and Audio Presentations to Wireless PDAs as Specified Using Extensions to SMIL," presented at Proceedings WWW2002, 2002.

Harrison, W., Ossher, H., and Tarr, P., "Software Engineering Tools and Environments: a roadmap," presented at Proceedings of the Conference on the Future of Software Engineering, 2000.

ITU-T, "Overall Network Aspects and Functions, ISDN User-network Interfaces: Principles of Intelligent Network Architecture," ITU, Geneva, Recommendation Q.1201, Oct. 1992.

ITU-T, "Digital Subscriber Signaling System No. 1—Generic procedures for the control of ISDN supplementary services," International Telecommunications Union, Geneva, ITU-T Recommendation Q.932, May 1998.

ITU-T, "Gateway control protocol: Version 2," ITU, Geneva, Recommendation H.248.1, May 2002.

Kay, M., "XSL Transformation (XSLT) Version 2.0," World-Wide Web Consortium, Last Call Working Draft http://www.w3.org/TR/xslt20/, Nov. 12, 2003.

McCabe, T., "A Complexity Measure," *IEEE Transactions on Software Engineering*, 1976.

Niitsu, Y. and Mizuno, O., "Interactive Specification Environment for Communication Service Software," *IEEE Journal Selected Areas in Communication*, vol. 8, pp. 181-188, 1990.

Parnas, D., "On the Criteria to be Used in Decomposing Systems into Modules," *Communications of the ACM*, vol. 15, pp. 1053-1058, 1972.

Pavlou, G. and Tin, T., "A CMIS-Capable Scripting Language and Associated Lightweight Protocol for TMN Applications," in *IEEE Communications Magazine*, 1996.

Raggett, D., Le Hors, A., and Jacobs, I., "HTML 4.01 Specification," W3C, Recommendation Dec. 24, 1999.

Ramakrishnan, N., Capra, R., and Pérez-Quiñones, M. A., "Mixed-Initiative Interaction=Mixed Computation," presented at Proceedings PEPM '02, 2002.

Roach, A., "Session Initiation Protocol (SIP)-Specific Event Notification," IETF, Standards Track RFC RFC3265, Jun. 2002.

Rosenberg, J., *Distributed Algorithms and Protocols for Scalable Internet Telephony*, Ph.D. Thesis, Columbia University Graduate School of Arts and Sciences, New York, 2001.

Rosenberg, J., Schulzrinne, H., Camarillo, G., Johnston, A., Peterson, J., Sparks, R., Handley, M., and Schooler, E., "SIP: Session Initiation Protocol," IETF, RFC RFC3261, Jun. 2002.

Schulzrinne, H. and Petrack, S., "RTP Payload for DTMF Digits, Telephony Tones and Telephony Signals," IETF, RFC 2833, May 2000.

Schulzrinne, H., Casner, S. L., Frederick, R., and Jacobson, V., "RTP: A Transport Protocol for Real-Time Applications," IETF, RFC 3550, Jul. 2003.

Shah, J. and Prescher, K., "Application of a new network concept for faster service deployment," presented at Communications, 1988. ICC 88. Digital Technology—Spanning the Universe. Conference Record. IEEE International Conference on, Philadelphia, PA USA, 1988.

Tarr, P., Ossher, H., Harrison, W., and Sutton, J., S., "N Degrees of Separation: Multi-Dimensional Separation of Concerns," presented at Proceedings of the 21st international conference on Software engineering, 1999.

Thompson, H. S., Beech, D., Maloney, M., and Mendelsohn, N., "XML Schema Part 1: Structures," W3C, Recommendation May 2, 2001.

Wray, S., Glauert, T., and Hopper, A., "The Medusa applications environment," presented at Multimedia Computing and Systems, 1994., Proceedings of the International Conference on, Boston, MA USA, 1994.

Adam Roach, Ericsson Inc., Event Notification SIP Subscribe and Notify and an Example Service, Mar. 26, 2000.

Lars Berggren, IX66 Internet Gate A Firewall with SIP Support, Intertex Data AB, Sweden, © 2001 Intertex Data AB, pp. 1-19.

* cited by examiner

REMOTE CONTROL OF DEVICE BY TELEPHONE OR OTHER COMMUNICATION DEVICES

CROSS REFERENCE TO RELATED APPLICATIONS

This application is a continuation-in-part of U.S. patent application Ser. No. 10/785,501, filed Feb. 24, 2004 now U.S. Pat. No. 7,406,696, titled "System And Method For Providing User Input Information To Multiple Independent, Concurrent Applications."

STATEMENT REGARDING FEDERALLY SPONSORED RESEARCH OR DEVELOPMENT (Not applicable)

BACKGROUND OF THE INVENTION

The present invention is related to remote control of devices, and, in particular, to remote control of devices using telephones or other communication devices using a telephony signaling path.

Many communications and information services are enabled by telephone access to computer applications. A common mode for interacting with such computer applications is through a touch-tone telephone. Services often connect multiple applications to the user. For example, it is possible for a voice messaging service to be accessed through a pre-paid service. However, this creates a modality problem. For example, the pre-paid platform might wish to know when the user presses and holds the "#" key for a relatively long time (this being referred to as both the "long pound" and the "long octothorpe"), while the voice messaging platform might wish to know when the user enters digits, such as for menu navigation. The modality problem is that all digits entered by the user today get sent to both applications, as the digits are sent and both applications listen to the bearer channel. Each application must be prepared to receive and discard notifications of key presses in which it has no interest, complicating the design of the application as well as wasting the use of processing and communications resources during operation.

Numerous applications have been deployed for use in conjunction with the traditional time-division-multiplexed (TDM)-based telephone network. In many cases the applications simply receive the TDM-based "in-band" media stream, i.e., the voice channel, and the applications are responsible for continually decoding the media and monitoring for the presence of certain user input of a signaling nature, such as tones indicating that a particular key on the telephone keypad has been pressed. Certain improvements to the TDM network have been made, such as the Advanced Intelligent Network (AIN), which have the goal of separating signaling traffic from media traffic. However, in practice most of the application logic resides in an "intelligent peripheral" that is coupled along the media path, because of the low-level, device control nature of the associated protocols. There are too many messages with too short a latency budget for a total separation of application logic from the Intelligent Peripheral. The result is that application developers write their applications for deployment on the intelligent peripheral, usually with proprietary intelligent peripheral languages. Thus, AIN does not fulfill the promise of separating application logic from media processing.

The situation is more complex for the packet-switched environments, such as Voice-over-IP. Existing approaches such as H.248.1 (MEGACO), Session Initiation Protocol (SIP) and an in-band technique described in RFC 2833 are described in turn.

H.248.1 (MEGACO) has a provision for reporting key press digits detected or generated by an "endpoint", which in H.248.1 is a media gateway (MG). The MG can be an IP phone, an access gateway, or a trunking gateway. In the case of the IP phone, the IP phone can transmit the key presses directly at the protocol level. In the case of a gateway, the gateway can detect the key presses using DTMF detectors. Media Gateway Control Protocol (MGCP) is a proprietary Cisco protocol that operates in much the same manner as H.248.1. These protocols employ a master-slave approach in which a Media Gateway Controller (MGC) commands the MG (using a device control protocol signaling link) to connect a tone detector to an incoming circuit and wait for a digit map match. When the MG detects a key press pattern of interest, it notifies the MGC over the same signaling link, returning the actual digit string detected.

In H.248.1, however, one and only one MGC may control the resources in an MG. Applications that have an interest in user signaling must be a part of the MGC application—there is no provision for independent, third-party applications to receive user signaling information. In MGCP, a first MGC may "pass off" control to a second MGC, but one and only one MGC may control a resource at any given time. The limitation of one and only one controller controlling a resource is a direct result of the master/slave nature of the MGCP and H.248.1 protocols. That is, the protocol requires the MG to be in an exclusive relationship to an MGC. Although these protocols also allow for "virtual MGs" within a physical MG, in which case there may be multiple MGCs serving as masters to the set of virtual MGs in a single physical MG, the virtual MGs are simply partitions of a physical MG. There is no provision for enabling multiple independent applications to selectively obtain user signaling information from a single stream of user input.

It has been proposed that a peer-to-peer protocol such as the Session Initiation Protocol (SIP) be used to transport key press signaling, such as via the SIP INFO method. The proposed mechanism closely follows the protocol of MGCP and H.248.1, including the use of MGCP and H.248.1 messages for specifying digit maps and notifications. However, the proposals have envisioned only a single application requesting notifications, which is a result of there being no mechanism for addressing endpoints of interest.

Cisco Systems has introduced a method for transporting DTMF digits using SIP in the SIP signaling path using the SIP NOTIFY method. However, this method has a number of disadvantages. First, notifications can only go to a single egress gateway; it is not possible for a third-party application to register for notifications. Second, the egress gateway receives notifications of every DTMF digit, whether it has an interest in them or not. Third, there is no provision for selectively passing through or clamping the DTMF tones from the media stream. If the ingress gateway passes DTMF, there is the risk of network elements interpreting both the in-band DTMF and the corresponding DTMF signaling received via the NOTIFY mechanism, potentially resulting in incorrect operation.

Another proposed method of transporting key press signaling is to use in-band representations for the keys. For example, RFC 2833 describes transporting key presses as named events, rather than as digital waveforms representing the key presses. While this approach uses less bandwidth and processing resources in the media path, it has serious drawbacks that limit its usability. First, a point-to-point media relationship between the endpoint and the application is generally assumed, leaving no provision for third-party involvement with collecting digits. Although in theory RFC 2833 could be used with third-party applications, rather complicated and unrealistic setup and operation are required. Additionally, because of the particular way that RFC 2833 handles redundancy, it does not meet the reliability requirements for signaling traffic. Moreover, RFC 2833 uses more bandwidth than is necessary, by sending multiple copies of the same packet for normal, lossless operation. Finally, applications receive all key presses, whether they have an interest in the key presses or not, making for inefficient use of communication and processing resources.

Many prior systems enable users to remotely control devices, such as household appliances, office equipment or equipment at unmanned locations, via telephone. In such a system, the user presses buttons on the telephone keypad to send commands to a remotely controlled device. Most such systems require establishing a voice path to carry DTMF signals between a remote telephone and the device or a separate controller that is connected to the device. (For simplicity, the device and such a separate controller are collectively referred to in this Background as a remotely controlled device.) Such systems require DTMF detection hardware or software in the remotely controlled device. In addition, if a remote control telephone call is routed over a voice-over-IP (VoIP) or similar packet-switched network to the remotely controlled device, the device requires a real-time protocol (RTP) stack to receive the DTMF audio signals, even though the device receives no other audio signals. Thus, expensive special purpose equipment is required in or near the remotely controlled device.

Additional complications are introduced if local telephones, i.e., telephones located on the same premises as the remotely controlled device, are to be used to control the device. When a device is controlled via a telephone call placed to the device from a remote telephone (i.e., a telephone not located on the same premises as the remotely controlled device), the device typically employs some form of authentication, such as requiring entry of a passcode, to ensure the caller is authorized to remotely control the device. However, from the perspective of the remotely controlled device, local telephones are treated the same as remote telephones, in that the same authentication method is used for local telephones as for remote telephones. For example, if attempts to remotely control the device from a remote telephone require entry of a passcode, attempts to control the device from a local telephone also require entry of the passcode, even though the local telephone is in a secure location, such as within the same house as the remotely controlled device. Such authentication methods for local telephones make the user interfaces to such systems cumbersome and unfriendly.

In some systems, a user of a mobile telephone sends a short text message (SMS message) to a vending machine to authorized a purchase, provide billing information (such as the user's mobile telephone number) and/or send a product selection to the vending machine. In such systems, the user must compose the SMS message and send the message to the vending machine's address. However, no call is placed to the vending machine.

BRIEF SUMMARY OF THE INVENTION

In accordance with the present invention, a system and method for remotely controlling a remotely controlled device via a communication device, such as a telephone, is disclosed. The system and method control the remote device solely over a telephony signaling path, without necessarily establishing an audio path between the communication device and the remotely controlled device, thus eliminating the need for the remotely controlled device to include DTMF detection hardware or software or an RTP stack.

In some embodiments, the communication device includes authentication information, which the communication device uses to authenticate itself to the remotely controlled device, so a user of the communication device can remotely control the device without necessarily entering additional authentication information, such as a passcode. Such a communication device can be used on the same premises as the remotely controlled device, thereby simplifying the user interface to the remotely controlled device. In addition, the communication device can be use off the premises. In either case, the communication device acts as an authentication token for the user, eliminating the need for the user to enter authentication information to remotely control the device.

In some embodiments, the remotely controlled device (or a controller that controls the device) registers with an element that detects user interactions, such as keypad button presses, with the communication device. The registration can identify one or more patterns of user input. If the element detects the specified pattern of user input in a user interaction with the communication device, the element notifies the remotely controlled device (or the controller). Optionally, other application servers can also register with the element to be notified if the user enters the same or a different pattern of input in a user interaction with the communication device.

In accordance with the present invention, a system and method for providing user input information to multiple independent, concurrent applications is also disclosed.

The applications generate respective subscription messages that are provided to a device receiving input of a predetermined type from a user, such as key presses on a telephone keypad. The subscription message for each application identifies a respective pattern of the user input that the application is to be notified of. The device may receive the input directly, such as in the case of a telephone that receives key press information directly from the telephone keypad. Alternatively, the device may be of a type, such as a media proxy, that resides along a media path between the user and the application, in which case the device obtains the user input from the media stream.

The device monitors the input from the user to identify the occurrence of the respective patterns identified in the subscription messages. Upon the occurrence of the pattern in a given subscription message, the device notifies the corresponding application via a signaling channel linking the application with the device. In general, the device only notifies the particular application that provided the subscription message, and thus processing and communications resources are conserved.

The subscription messages use regular expressions that can include various types of formats to specify the patterns of interest. For example, the formats can specify a single digit (either explicitly or in wildcard form), one of a set of digits, a range of digits, and/or a repeating pattern of digits. The subscription messages can also contain tags associated with the regular expressions. When a match is detected and reported to the application by the device, the tag is also returned, enabling the application to easily determine exactly what response to the input is appropriate without needing to maintain a large amount of internal state information.

Other aspects, features, and advantages of the present invention will be apparent from the Detailed Description that follows.

BRIEF DESCRIPTION OF THE SEVERAL VIEWS OF THE DRAWINGS

The invention will be more fully understood by reference to the following Detailed Description of the invention in conjunction with the Drawing, of which.

DETAILED DESCRIPTION OF THE INVENTION

The contents of U.S. patent application Ser. No. 10/785,501, filed Feb. 24, 2004, titled "System And Method For Providing User Input Information To Multiple Independent, Concurrent Applications," are incorporated by reference herein.

In accordance with the present invention, a method and apparatus is disclosed for providing user input information to a plurality of independent, concurrent applications and for remotely controlling a device via a communication device, such as a telephone.

Providing User Input Information to a Plurality of Applications

Figure 1:
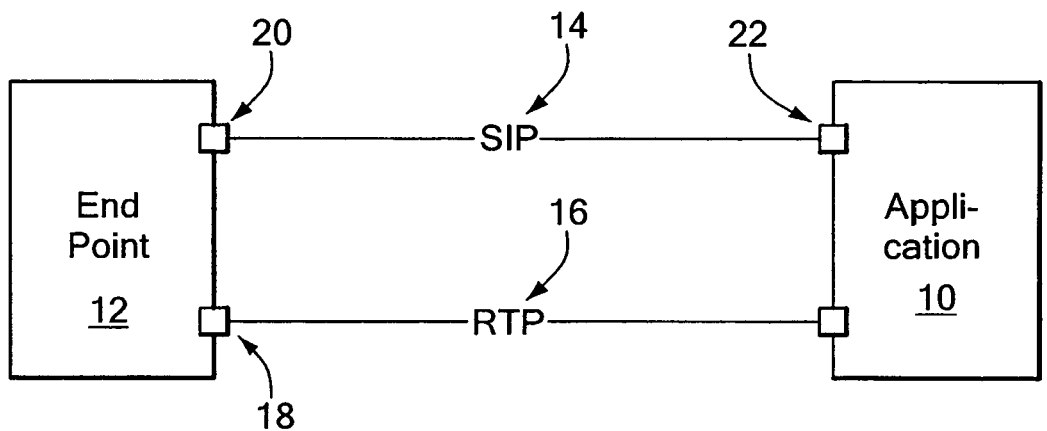
FIG. 1 is a block diagram of a first system for signaling user key press information to applications in accordance with the present invention.

FIG. 1 shows a first embodiment in which an application 10 (which is a SIP User Agent (UA)) directly interacts, on a given two-party dialog, with an "end point device" 12. The application 10 is connected to the end point device 12 by both a SIP connection 14 (for signaling) and one or more Real-Time Protocol (RTP) connections 16 (for media). In this scenario, the application 10 requests that the end point device 12 report via the SIP connection 14 on key press events that might normally emanate from the end point device's RTP port 18. The illustrated configuration can represent, for example, a toll by-pass scenario where the end point device 12 is an ingress gateway and the application 10 is an egress gateway.

In the case shown in FIG. 1, the application 10 requests digit notification on the same dialog established for the call, between SIP ports 20 and 22. The use of SIP and RTP in FIG. 1 is for exemplary purposes only. Other signaling mechanisms such as H.323 can be used, and other bearer mechanisms such as ATM or TDM can be used.

In general, the end point device 12 may receive the input directly, such as in the case of a telephone that receives key press information directly from the telephone keypad. Alternatively, the device may be of a type, such as a media proxy, that resides along a media path between the user and the application, in which case the end point device 12 obtains the user input from the media stream. An example of such a configuration is shown below. In general, the end point device 12 includes hardware and software processing resources and interfaces in accordance with its function in the system. In particular, the end point device 12 includes hardware for monitoring the user input to detect patterns of interest, as described in more detail below, and one or more processors programmed to implement the signaling functionality described herein.

Figure 2:
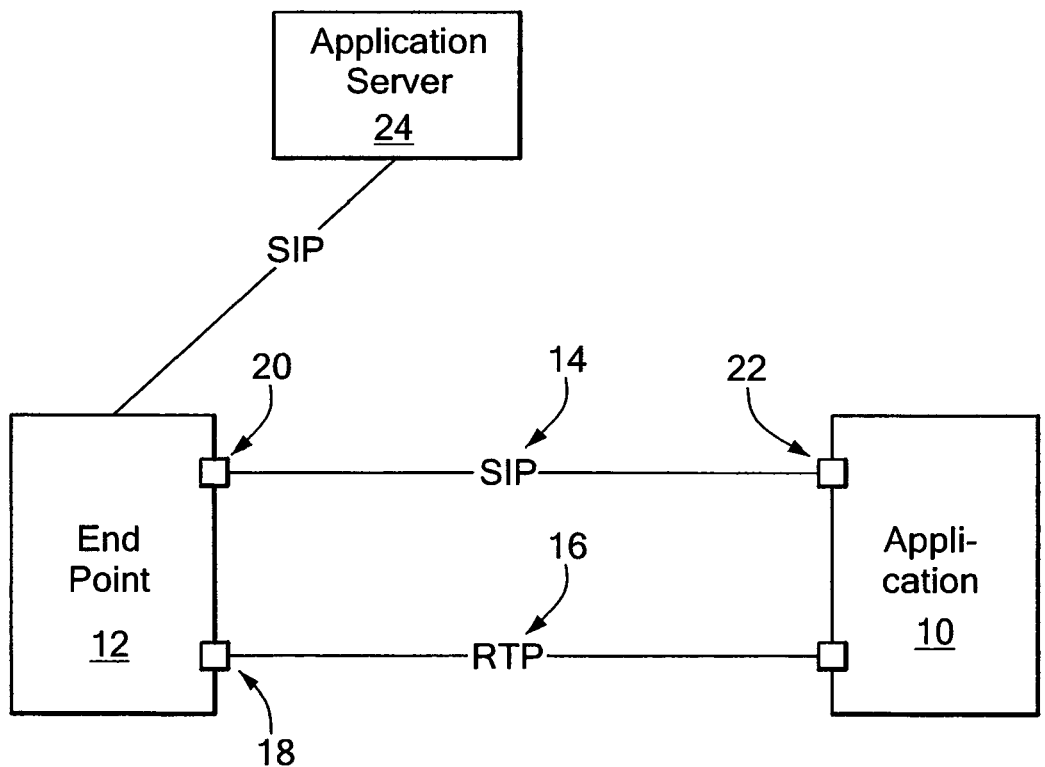
FIG. 2 is a block diagram of a second system for signaling user key press information to applications in accordance with the present invention.

FIG. 2 shows a second embodiment that supports a third-party application 24 that is interested in user key presses occurring in the context of an established two-party SIP dialog between the end point device 12 and the first application 10. The third party application 24 addresses the particular media stream by referencing an established SIP dialog identifier that refers to the dialog between the SIP ports 20 and 22.

Figure 3:
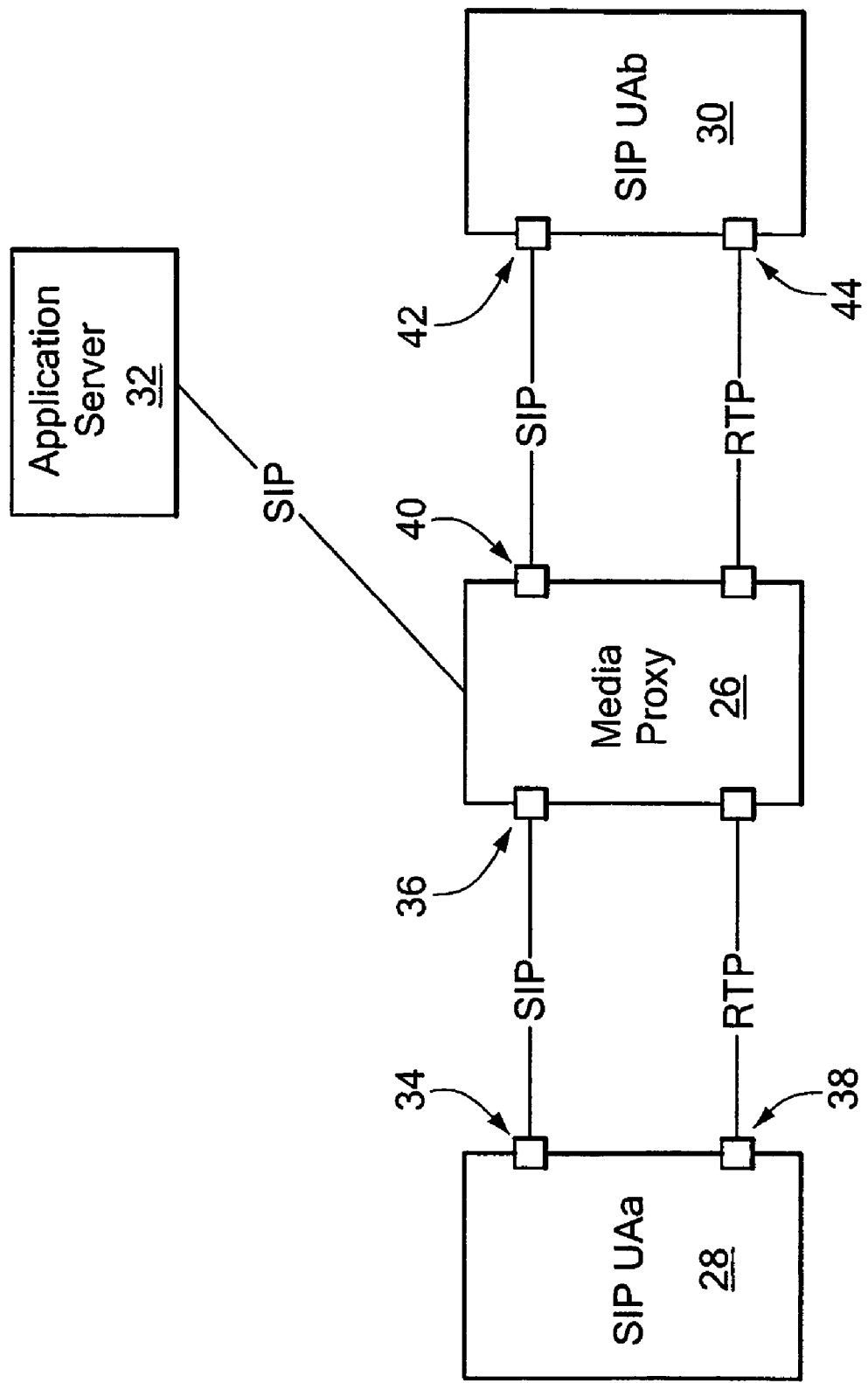
FIG. 3 is a block diagram of a third system for signaling user key press information to applications in accordance with the present invention.

FIG. 3 shows a third embodiment employing a "media proxy" 26 that monitors the media stream among a plurality of endpoints. A media proxy is a device that forwards media streams under the control of a signaling component that provides, at a minimum, instruction as to the source and destination addresses. In addition to the media forwarding function, the media proxy 26 can also do light media processing, such as tone detection. An example of a media proxy is the A1-G2 MF from SnowShore Networks, Inc.

In FIG. 3, the media proxy 26 has established connections to a first endpoint User Agent UAa 28 and a second endpoint User Agent UAb 30. A requesting application 32 uses dialog identifiers to identify the stream to monitor. The default is to monitor the media entering the end point device. For example, if the requesting application 32 uses the dialog represented by SIP ports 34 and 36, then the media coming from UAa RTP port 38 is monitored. Likewise, specifying the dialog represented by ports 40 and 42 directs the media proxy 26 to monitor the media coming from UAb RTP Port 44. The requesting application 32 can monitor the reverse direction or other, related streams. There could also be multiple streams if there are multiple audio sources, for example.

Figure 4:
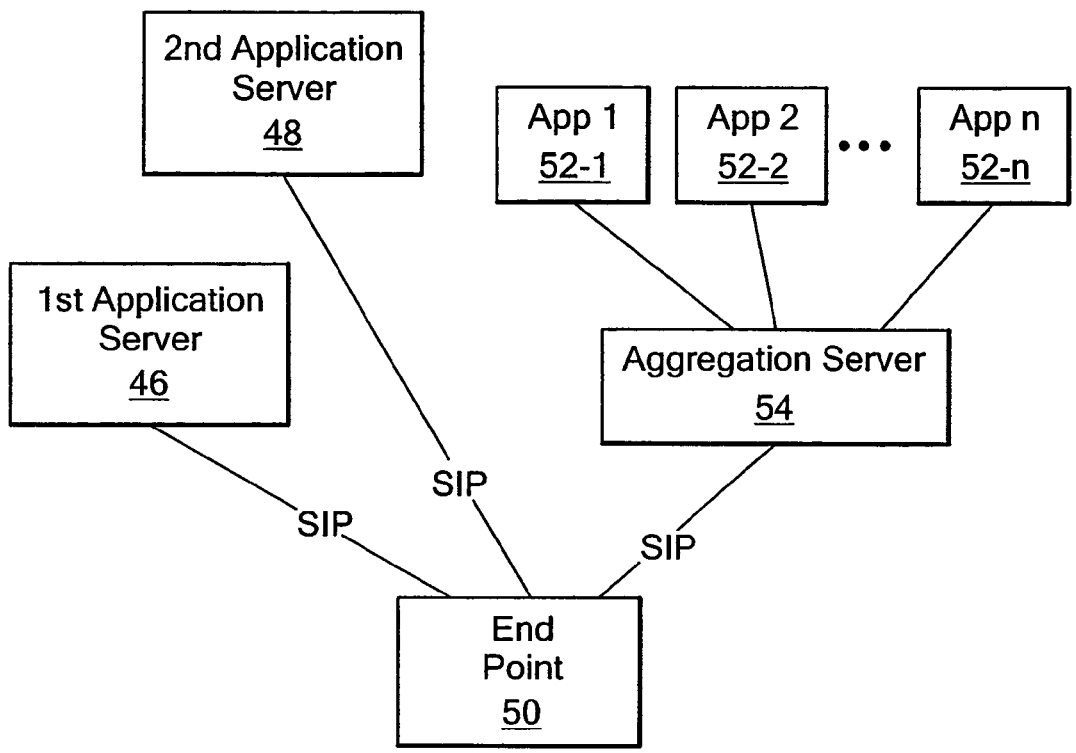
FIG. 4 is a block diagram of a fourth system for signaling user key press information to applications in accordance with the present invention.

As shown in FIG. 4, a plurality of applications may be interested in receiving different notifications of digit map patterns. Applications 46 and 48 make requests directly to, and receive reports directly from, an end point device 50. Other applications 52-1, 52-2, . . . 52-n register with a controlling, or "aggregation", server 54, which collapses the various requests into as few as one KPML request to the end point device 50.

One problem with employing an aggregation server 54 is its potential to become a bottleneck, because it must process all of the requests and forward them on to the end point device 50. Another problem is that some patterns may have complex inter-key-press timing relationships within a pattern, but not across independent pattern requests, thus making it difficult to specify values for the various timers. Finally, the aggregation server 54 must disambiguate and forward responses appropriately in the face of conflicting or overlapping expressions from the different requesting applications 52. Thus, to avoid such problems, it is generally preferred that the individual requesting applications, such as applications 46 and 48 in FIG. 4, make requests directly to an end point device such as end point device 50. Note that this approach still supports the aggregation model presented by the aggregation server 54.

In addition to reducing network traffic, one of the goals of the presently disclosed technique is to reduce processing requirements at the requesting applications. For example, assume the first requesting application 46 of FIG. 4 is looking for "*", while the second requesting application 48 is looking for "L#", the octothorpe key pressed for a time. When the end point device 50 detects the "*" pattern, it would be inefficient to send a report to the second requesting application 48. Thus, the end point device 50 sends the notification only to the first requesting application 46.

The system described herein uses a subscription protocol mechanism, whereby a party such as the application server 32 subscribes to the key press state of a device such as the media proxy 26 or end point device 12. The SIP SUBSCRIBE/NOTIFY mechanism, as described in RFC 3265, can be employed. If media sessions are set up using the SIP INVITE mechanism, as described in RFC 3261, then requesting applications can use the SIP call identifiers to identify the media leg to be monitored. In alternative embodiments, session description protocol (SDP) identifiers such as Internet Protocol address and Port numbers can be used.

The SIP SUBSCRIBE/NOTIFY mechanism provides a means for handling multiple, independent requests. Namely, subscriptions on different SIP dialogs are independent. In addition, a subscription on a particular dialog, with a unique event identifier tag (the "id" tag to the "event" entity in the SUBSCRIBE request) is also an independent subscription for the purposes of key press handling and reporting.

SUBSCRIBE/NOTIFY protocols provide subscription state management. Following the mechanics of RFC 3261, if an end point device 12 receives a SUBSCRIBE request on an existing subscription, the end point device 12 unloads the current subscription and replaces it with the new one.

One goal of the presently disclosed system is to reduce network traffic by consolidating multiple digit presses into one notification message. The system can take advantage of the fact that many telephony applications are interested in not only a single key press, but multiple key presses. For example, collecting a North American Numbering Plan telephone number requires collecting 10 digits, while collecting a Personal Identification Number (PIN) code may require collecting 4 to 6 digits. The system achieves this goal by having the requesting application include regular expressions describing the patterns to collect. The following section describes one embodiment of a regular expression syntax that can be employed. This syntax is referred to as DRegex, for digit regular expression. It should be noted that "white space" is removed before DRegex is parsed, which enables sensible printing in XML without affecting the meaning of the DRegex string.

Table 1 describes the use of DRegex. Table 2 gives some examples of DRegex regular expression formats.

TABLE 1

| Format | Matches |
|---|---|
| digit | single digit 0-9 and A-D |
| # | # key |
| * | * key |
| [digit selector] | Any digit in selector |
| [^digit selector] | Any digit NOT in selector |
| [digit-range] | Any digit in range |
| x | Any digit 0-9 |
| . | Zero or more repetitions of previous pattern |
| \| | Alternation |
| {m} | m repetitions of previous pattern |

TABLE 1-continued

| Format | Matches |
|---|---|
| {m,} | m or more repetitions of previous pattern |
| {,n} | At most n (including zero) repetitions of previous pattern |
| {m,n} | at least m and at most n repetitions of previous pattern |
| Lc | Match the character c if it is "long"; c is a digit, #, or *. |

TABLE 2

| Example | Description |
|---|---|
| 1 | Matches the digit 1 |
| [179] | Matches 1, 7, or 9 |
| [^01] | Matches 2, 3, 4, 5, 6, 7, 8, 9 |
| [2-9] | Matches 2, 3, 4, 5, 6, 7, 8, 9 |
| x | Matches 0, 1, 2, 3, 4, 5, 6, 7, 8, 9 |
| 2\|3 | Matches 2 or 3; same as [23] |
| 00\|011 | Matches the string 00 or 011 |
| 0. | Zero or more occurrences of 0 |
| [2-9]. | Zero or more occurrences of 2-9 |
| *6[179#] | Matches *61, *67, *69, or *6# |
| 011x{7,15} | 011 followed by seven to fifteen digits |
| L* | Long star |

Referring again to FIG. 4, a first requesting application 46 requests that an end point device 50 report detected key presses. The requesting application 46 registers for a pattern, such as "*" (three stars in succession), using the SUBSCRIBE mechanism. When the end point device 50 detects the pattern, it sends a NOTIFY message to the requesting application 46**, noting the detection of the pattern. Example 1 shows a request, using an embodiment of a protocol language referred to as the Key Press Markup Language (KPML).

```
<?xml version="1.0" encoding="UTF-8"?>
<kpml xmlns="urn:ietf:params:xml:ns:kpml"
    xmlns:xsi="http://www.w3.org/2001/XMLSchema-instance"
    xsi:schemaLocation="urn:ietf:params:xml:ns:kpml kpml.xsd"
    version="1.0">
    <request>
        <pattern>
            <regex>***</regex>
        </pattern>
    </request>
</kpml>
```

EXAMPLE 1

Single Regular Expression Request

The message in Example 1 is a request registering a set of patterns, of which there is only a single regular expression, that of the three stars ("***").

A requesting application can also register for multiple patterns. For example, the requesting application could look for any of a set of patterns "***", "*1", "*61", and "*62", as shown in Example 2.

```
<?xml version="1.0" encoding="UTF-8"?>
<kpml xmlns="urn:ietf:params:xml:ns:kpml"
    xmlns:xsi="http://www.w3.org/2001/XMLSchema-instance"
    xsi:schemaLocation="urn:ietf:params:xml:ns:kpml kpml.xsd"
    version="1.0">
    <request>
        <pattern>
            <regex>***</regex>
            <regex>*1</regex>
            <regex>*61</regex>
            <regex>*62</regex>
        </pattern>
    </request>
</kpml>
```

EXAMPLE 2

Multiple Regular Expressions Request

There are different techniques that can be used to determine what pattern matches a given key press string, including for example longest match, shortest match, or most specific match. The matching algorithm to use can be specified in the KPML message. Although in many cases the longest match will be preferable, this technique has the problem that the system will always wait for the next digit, even if the best match has occurred. That is, all key press collection events end with a timeout.

To improve the user experience by having fast reporting of a match, while maintaining the longest match property, the system uses a set of special timers and the specification of an Enter Key Sequence. The timers are the critical timer, the inter-digit timer, and the extra digit timer. The critical timer is the time to wait for another digit if the collected digits can match a pattern. The extra timer is the time to wait after the longest match has occurred (presumably for the return key). The inter-digit timer is the time to wait between digits in all other cases. Note there is no start timer, as that concept does not apply in the KPML context.

The Enter Key Sequence is a method whereby one specifies a key press or string of key presses that indicates to the system that entry is complete. The system reports immediately with a match or no match error upon receipt of the Enter Key Sequence. For convenience, the system does not send the Enter Key Sequence in the report. This saves the requesting application from having to trim irrelevant information. Note that the Enter Key Sequence cannot also be a substring in the regular expression.

For patterns such as the long octothorpe, applications instruct the device what constitutes "long" by setting a "long-timer" attribute in the <pattern> tag to the number of milliseconds desired. Some phones, particularly private branch exchange (PBX) phones, transmit a digit for a preset length of time, such as 50 ms, irrespective of how long the user presses the respective key. To enable applications to respond to said devices, applications may indicate to the device to consider a repetition of a key press within the longtime time period. Applications indicate this behavior to the device by setting the longrepeat attribute to "true" in the <pattern> tag.

Example 3 shows an example of a request that registers for a long octothorpe. With a longtimer value of 2000, the device will look for a minimum key press duration of two seconds (2000 milliseconds). This example also directs the device to match a succession of octothorpe keys for two seconds as long key press duration by setting longrepeat to true.

```
<?xml version="1.0" encoding="UTF-8"?>
<kpml xmlns="urn:ietf:params:xml:ns:kpml"
    xmlns:xsi="http://www.w3.org/2001/XMLSchema-instance"
    xsi:schemaLocation="urn:ietf:params:xml:ns:kpml kpml.xsd"
    version="1.0">
    <request>
        <pattern longtimer="2000" longrepeat="true">
            <regex>L#</regex>
        </pattern>
    </request>
</kpml>
```

EXAMPLE 3

Long Octothorpe Request

Some applications care to continuously monitor the stream for a particular pattern, while other applications look for only a single occurrence of a particular pattern, at which time the application is finished monitoring the end point device or may register a different set of patterns. The first type of request is referred to as a "persistent" request, while the second type is termed a "one-shot" request. The system provides for the requesting application to specify the nature (persistent or one-shot) of the request.

It is advantageous to refrain from notifying applications of key presses that are not of interest. However, it is possible that a human user may press spurious keys or accidentally press an incorrect key. Applications need to perform error recovery in this situation. The disclosed system addresses this problem by starting an inter-digit timer upon detection of the first key that matches the first character of any regular expression in a subscription. This inter-digit timer restarts after every key press detected. If the inter-digit timer expires, the end point device sends a failure notification to the requesting application(s) for which the key presses started to match patterns. This notification enables the requesting application to take different actions based on the incomplete key presses.

Another situation that can occur is for the end point device to start collecting key press events and the media dialog to terminate before a pattern matches. Again, the end point device sends the key presses collected up to the point of the dialog termination to the requesting application.

The system and protocol described herein could use any of a variety of message transport mechanisms. As described herein, one preferred transport employs SIP SUBSCRIBE and NOTIFY requests to transport an XML markup called KPML. Those skilled in the art could derive alternate representations for the protocol messages described herein, such as ASN.1 notation for example.

As shown in Example 3, a KPML message contains a <request> entity that includes a <pattern> tag with a series of <regex> elements. The <regex> element specifies a digit pattern for the device to report on. Because a requesting application may need to know which <regex> of a plurality of <regex>s matched, KPML supports a tag attribute to the <regex> element. When there is a match, the report from the end point device includes the tag of the match's <regex> element. Example 4 shows the case where a seven-digit number matches the "local" tag, a 1+ten-digit number matches the "ld" (or long distance) tag, and a 011 followed by a number and five to fifteen digits matches the "iddd" (or international direct distance dialing) tag. A sample response is in Example 5.

```
<?xml version="1.0" encoding="UTF-8"?>
<kpml xmlns="urn:ietf:params:xml:ns:kpml"
    xmlns:xsi="http://www.w3.org/2001/XMLSchema-instance"
    xsi:schemaLocation="urn:ietf:params:xml:ns:kpml kpml.xsd"
    version="1.0">
    <request>
        <pattern extradigittimer="1000" interdigittimer="5000">
            <regex tag="local">x{7}</regex>
            <regex tag="ld">1x{10}</regex>
            <regex tag="iddd">011x{5,15}</regex>
        </pattern>
    </request>
</kpml>
```

EXAMPLE 4

Use of a Tag to Identify which Pattern Matched

```
<?xml version="1.0" encoding="UTF-8"?>
<kpml xmlns="urn:ietf:params:xml:ns:kpml"
    xmlns:xsi="http://www.w3.org/2001/XMLSchema-instance"
    xsi:schemaLocation="urn:ietf:params:xml:ns:kpml kpml.xsd"
    version="1.0">
    <response code="200" text="OK" digits="17035551212" tag="ld"/>
</kpml>
```

EXAMPLE 5

Tagged Response

A requesting application may advantageously use the tag attribute to encode, for example, state information. In this way, the requesting application can be a stateless, stimulus driven application. By using the tag attribute to carry state, the requesting application need not carry per-session state. This results in a significant savings in memory and processing requirements at the requesting application, thus offering higher scale and performance for the application.

For example, Example 6 shows the request for a first device, while Example 7 shows the request for a second device. The server can tell the different requests apart from the unique prefix, in this case "id00" and "id01" for Example 6 and Example 7, respectively. Note that the tags are opaque strings and can contain however much state information the client requires. In the examples here, the identifiers "id00" and "id01" are enough to associate the results with a session. The identifiers can have any arbitrary state information that is meaningful to the application. For example, a tag might be "from-host-192.168.1.12 at step 24 cookie='23d0ij32d0ioicq3icoiqwjemf'", representing host information, sequence information, and arbitrary data.

```
<?xml version="1.0" encoding="UTF-8"?>
<kpml xmlns="urn:ietf:params:xml:ns:kpml"
    xmlns:xsi="http://www.w3.org/2001/XMLSchema-instance"
    xsi:schemaLocation="urn:ietf:params:xml:ns:kpml kpml.xsd"
    version="1.0">
    <request>
        <pattern extradigittimer="1000" interdigittimer="5000">
            <regex tag="id00-local">x{7}</regex>
            <regex tag="id00-ld">1x{10}</regex>
            <regex tag="id00-iddd">011x{5,15}</regex>
```

```
        </pattern>
    </request>
</kpml>
```

EXAMPLE 6

Use of a Tag to Identify Server State (Part 1)

```
<?xml version="1.0" encoding="UTF-8"?>
<kpml xmlns="urn:ietf:params:xml:ns:kpml"
    xmlns:xsi="http://www.w3.org/2001/XMLSchema-instance"
    xsi:schemaLocation="urn:ietf:params:xml:ns:kpml kpml.xsd"
    version="1.0">
    <request>
        <pattern extradigittimer="1000" interdigittimer="5000">
            <regex tag="id01-local">x{7}</regex>
            <regex tag="id01-ld">1x{10}</regex>
            <regex tag="id01-iddd">011x{5,15}</regex>
        </pattern>
    </request>
</kpml>
```

EXAMPLE 7

Use of a Tag to Identify Server State (Part 2)

Some devices buffer entered digits, and applications behave differently with respect to such buffered digits. Some applications may require that a user enter key presses only as the application is ready to receive them, in which case any key presses entered prematurely should be ignored or discarded. Other applications enable a user to "barge" through prompts or other delays in the user interface by entering key presses in advance of their prompts, for example, and then acting on the buffered key presses rather than discarding them.

In the disclosed system, the default is that the matching specified by new requests is carried out with respect to buffered digits first, such operation enabling "barging" behavior by the user. However, the protocol provides a <flush> tag in the <pattern> element to specify whether the buffer should be flushed before any matching operations begin, which has the effect of ignoring any digits entered before receipt of the KPML request. Additional detail on the digit buffering mechanism is provided below in conjunction with a description of key press "quarantining."

As mentioned above, an end point device may support an inter-digit timeout value, which is the amount of time the end point device waits for user input before returning a timeout error result on a partially matched pattern. The application can specify the inter-digit timeout as an integer number of milliseconds by using an inter-digit timer attribute to the <pattern> tag. The default is 4000 milliseconds. If the end point device does not support the specification of an inter-digit timeout, the end point device silently ignores the request. If the end point device supports the specification of an inter-digit timeout, but not to the granularity specified by the value presented, the end point device rounds up the requested value to the closest value it can support.

KPML messages are independent, a property that enables multiple requesting applications to simultaneously monitor a stream without interacting with each other. One result of this independence, however, is that it is not possible for a requesting application to know whether a following request from another application will enable barging or want the digits flushed. Therefore, the end point device quarantines all digits detected between the time of a notification and the interpretation of the next request, if any. If the next request indicates a buffer flush, then the end point device flushes all collected digits from consideration from KPML requests received on that dialog with the given event id. If the next request does not indicate that buffered digits should be flushed, then the end point device applies the buffered digits (if possible) against the digit maps presented by the request's <regex> tags. If there is a match, the end point device issues the appropriate notification. If there is no match, the end point device flushes all of the collected digits on that request's buffer.

By default, the end point device transmits in-band tones (RFC 2833 events or actual tones) on the media channel in parallel with digit reporting via the signaling channel. Note that in the absence of this behavior, a user device could easily break called applications. For example, consider a personal assistant application that uses "*9" for attention. If the user presses the "*" key, the device holds the digit looking for the "9". However, the user may enter another "*" key, possibly because they accessed an IVR system that looks for "*". In this case, the "*" would get held by the device, because it is looking for the "*9" pattern. The user would probably press the "*" key again, hoping that the called IVR system just did not hear the key press. At that point, the user device would send both "*" entries, as "**" does not match "*9". However, that would not have the effect the user intended when they pressed "*".

On the other hand, there are situations where passing through tones in-band is not desirable. Such situations include call centers that use in-band tone spills to affect a transfer. For those situations, a digit suppression tag "pre" can be used in conjunction with the <regex> tag to indicate that the transmission of digits in the media stream should be suppressed. There can only be one <pre> in any given <regex>. An example of a request including a suppression tag is shown in Example 8.

If there is only a single <pattern> and a single <regex>, suppression processing is straightforward. The end point device passes digits until the stream matches the regular expression <pre>. At that point, the end point device will continue collecting digits, but will suppress the generation or pass-through of any in-band digits. When reporting on a match, the end point device will indicate whether it suppressed any digits by including an attribute "suppressed" with a value of "true" in the digit report.

```
<?xml version="1.0" encoding="UTF-8"?>
<kpml xmlns="urn:ietf:params:xml:ns:kpml"
    xmlns:xsi="http://www.w3.org/2001/XMLSchema-instance"
    xsi:schemaLocation="urn:ietf:params:xml:ns:kpml kpml.xsd"
    version="1.0">
    <request>
        <pattern>
            <enterkey>#</enterkey>
            <regex><pre>*8</pre>x{7}|x{10}</regex>
            <regex>*6</regex>
        </pattern>
    </request>
</kpml>
```

EXAMPLE 8

Digit Suppression

In Example 8, the end point device will begin to suppress digits after receiving the string '*8'. It then looks for seven or ten digits. If it receives something other than a digit, receives the enter key sequence, or times out, then the end point device will return an error report. Note the second pattern, <regex>*6</regex> does not start the digit suppression method.

Digit suppression can be optional for a device. If a device is not capable of digit suppression, it should ignore the digit suppression attribute and never send a suppressed indication in the digit report. In this case, it will match concatenated patterns of pre+value.

At some point during digit suppression, the end point device will collect enough digits to the point it hits a <pre> pattern. The inter-digit timer attribute indicates how long to wait once the user enters digits before reporting a time-out error. If the inter-digit timer expires, the endpoint issues a time-out report and transmits the suppressed digits on the media stream.

Once the end point device detects a match and it sends a NOTIFY request to report the digit string, the end point device stops digit suppression. Clearly, if subsequent digits match another <pre> expression, then the end device starts digit suppression again.

After digit suppression begins, it might become clear that a match will not occur. For example, take the expression "<regex><pre>*8</pre>xxx[2-9]xxxxxx</regex>". At the point the endpoint receives "*8", it will stop sending digits. Let us say that the next three digits from the user are "408", which match the "xxx" part of the pattern. If the next digit is a zero or one, the pattern will not match, meaning that there is no mechanism for re-enabling the sending of digits on the media connection.

Applications should be very careful to indicate suppression only when they are fairly sure the user will enter a digit string that will match the regular expression. In addition, applications should deal with situations such as no-match or time-out. This is because the endpoint will hold digits, which will have obvious user interface issues in the case of a failure. Also, it is very important for the endpoint to have a sensible inter-digit timer. This is because an errant dot (".") may suppress digit sending forever. Reasonable values are on the order of four seconds.

One unique aspect of the presently disclosed system is the handling of quarantined key presses. A quarantined key press is an event that does not yet match a regular expression. The system often quarantines key presses between the time of a notification and, particularly in the case of one-shot subscriptions, the receipt of a new subscription.

If the user presses a key not matched by the <regex> tags, the end point device discards the key press from consideration against the current or future KPML messages. However, once there is a match, the end point device quarantines any key presses the user entered subsequent to the match. This behavior allows for applications to only receive digits that interest them.

Before the receipt of the first subscription, the end point device does not normally quarantine key press events. This can create a race condition. Namely, the end point device can establish a session and have key press events occur before the end point device receives the first subscription. If this is of concern, the end point device can be provisioned to quarantine all key press events, or the end point device can be signaled at session establishment time that there will be a subscription. In the SIP environment, the first KPML subscription can be included as a separate MIME body part to the initial INVITE message.

At some point in time, the end point device has an indication to quarantine digits, either because of provisioning, explicit signaling, or receiving a subscription. That subscription will be associated with a SIP dialog or dialog/id pair. In the case of explicit provisioning or explicit signaling, there will be an implicit subscription on the INVITE dialog. In the case of a SUBSCRIBE request, the subscription is associated with the given SUBSCIBE-initiated dialog. Again, the end point device considers a SUBSCRIBE request with a unique "id" tag to be a new subscription for quarantine purposes.

The importance of separate subscriptions comes from the per-subscription quarantine of key presses. This enables application consistency. The application will get all key presses, in temporal order, which it is interested in, without interference from the subscriptions of other applications.

It could be required that the current request determine the quarantine policy for post -notification processing. This makes sense when all subscriptions come from a single application, which presumably is aware of its own quarantine needs. However, such an approach is not acceptable for a system that must support multiple independent applications, each potentially unaware of the others. Each request must set its own quarantine policy for the key presses already buffered.

Requests can explicitly flush the per-subscription key press buffer when the end point device loads a new KPML request on the given subscription by specifying the <flush>yes</flush> entity in the <pattern> tag. Also, requests can explicitly flush digits in the current subscription's buffer that have already been matched or considered by other subscriptions by specifying the <flush>others</flush> entity in the <pattern> tag.

Figure 5:
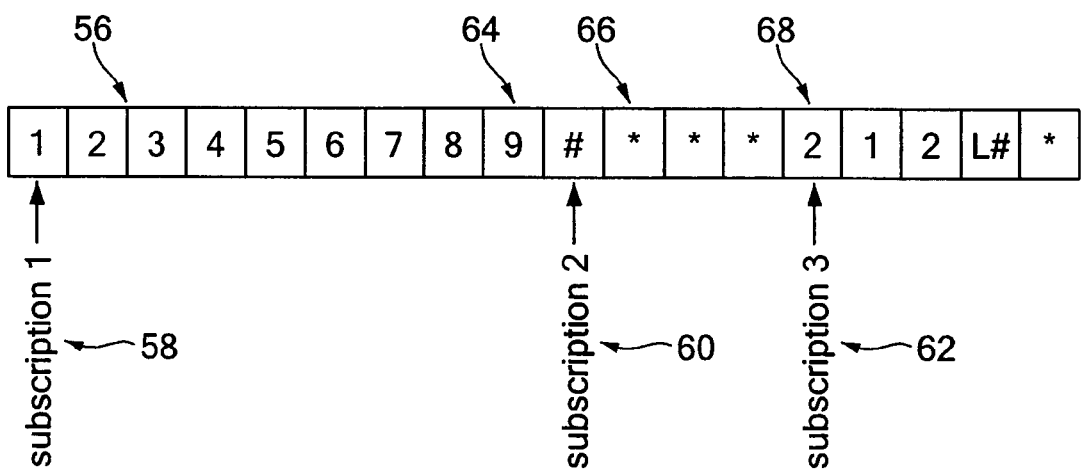
FIG. 5 is a diagram of a key press buffer and associated pointers used in any of the systems shown in FIGS. 1-4.

FIG. 5 shows a single key press buffer 56 for recording all key presses, with per-stream indices or pointers 58, 60, and 62 into the key press buffer indicating where in the buffer the stream is. Examples are given to illustrate operation of this buffer 56.

Consider the pattern <regex>xxxxxxxx</regex> specified by subscription 1. In this case, the buffered digits 12345678 match the pattern. Thus, the pattern succeeds, the end point device reports the match, and the pointer 58 is subsequently positioned at buffer location 64.

Next, consider the pattern <regex>x{10}</regex>. In this case, the collected digits 123456789# will never match the pattern, because "#" is not a digit and will not match 'x'. The pattern fails, the end point device reports the failure, and the pointer 58 is subsequently positioned at buffer location 66.

Finally, consider the pattern <regex>***</regex>. In this case, the end point device scans the buffer until the first*at position 66, which is the first character that matches the pattern, and thus bypasses the first 10 key presses entered. The pattern then succeeds, the end point device reports the match, and the pointer 58 will be positioned at buffer location 68.

Now consider what happens if a request specifies <flush>others</flush> and a <regex>x{7}</regex>. In -this case, other streams have seen key presses up to position 68, the position of buffer pointer 62. Thus the end point device moves the buffer pointer 58 to position 68 and then starts matching key presses. In this example, the pattern fails, as there are only three digits before a non-digit key (the long #). Because the end point device has considered all key presses between the positions pointed to by pointers 58 and 60, the end point device frees the memory in the buffer between those positions.

The key press buffer can be made quite large, for example by employing a large secondary storage device in the form of a hard disk. The end point device can put parts of the key press buffer onto the secondary storage device, keeping more recently referenced buffered key presses in main memory. This operation is accomplished in a straightforward manner using conventional virtual memory techniques.

Even with a large secondary storage device, it is possible to fill the buffer completely, especially if a large number of media streams are being monitored and if many streams have multiple subscriptions. To address this problem, the end point device can use a circular buffer. When the end-of-buffer pointer will overlap a given subscription's pointer, the subscription's pointer is set to the next subscription pointer, in increasing time order. The end point device also sets a "forced_flush" indicator for the subscription pointer, which is included in the end point device's report on a match or failure and then subsequently cleared.

Note that using a circular buffer is superior to having key presses age out of the buffer. This is because there is no reason to remove key press history if the memory is available. Likewise, under load, the buffer may still overflow if requests do not free digits off of the buffer fast enough. Nonetheless, the presently disclosed technique may be used with non-circular buffers as well.

When the user enters key press(es) that match a <regex> tag, the end point device will issue a report. After reporting, the end point device terminates the KPML session unless the subscription has a persistence indicator. If the subscription does not have a persistence indicator, the end point device sets the state of the subscription to "terminated" in the NOTIFY report. If the requestor desires to collect more digits, it must issue a new request. If the subscription has a persistence indicator, then the device uses the same <pattern> to match against future key presses.

KPML reports have two mandatory attributes, code and text. These attributes describe the state of a KPML interpreter on the end device. In the preferred embodiment, the SIP state of the subscription, such as "active" or "terminated", is also a protocol parameter. If one were to use a transport other than SIP that does not convey the subscription state, the subscription state must be one of the attributes of the KPML report.

Note that the KPML code is not necessarily related to the SIP result code. An important example is when a legal SIP subscription request gets a normal SIP 200 OK followed by a NOTIFY, but there is something wrong with the KPML request. In this case, the NOTIFY would include the KPML failure code in the KPML report. Note that from a SIP perspective, the SUBSCRIBE and NOTIFY were successful. Also, if the KPML failure is not recoverable, the end device will most likely set the Subscription-State to terminated. This lets the SIP machinery know the subscription is no longer active.

If a pattern matches, the end point device emits a KPML report. Since this is a success report, the code is "200" and the text is "OK". The KPML report includes the actual digits matched in the digit attribute. The digit string uses the conventional characters '*' and '#' for star and octothorpe, respectively. The KPML report also includes the tag attribute if the regex that matched the digits had a tag attribute. If the subscription requested digit suppression and the end device suppressed digits, the suppressed attribute indicates "true". The default value of suppressed is "false". Embodiments of the device may have a datum indicating if the device terminated digit collection due to the receipt of the Enter Key sequence in the KPML report. It may be desirable to omit this datum, as many applications do not need this information.

Example 9 shows a typical KPML response. This is an example of a response to the request shown in Example 4.

```
<?xml version="1.0" encoding="UTF-8"?>
<kpml xmlns="urn:ietf:params:xml:ns:kpml"
    xmlns:xsi="http://www.w3.org/2001/XMLSchema-instance"
    xsi:schemaLocation="urn:ietf:params:xml:ns:kpml kpml.xsd"
    version="1.0">
      <response code="200" text="OK" tag="ld" digits="17035551212"/>
</kpml>
```

EXAMPLE 9

Sample Response

There are a few circumstances in which the end point device will emit a no match report. They are an immediate NOTIFY in response to SUBSCRIBE request (no digits detected yet), a request for service not supported by the end device, or a failure of a digit map to match a string (timeout). Preferably, the NOTIFY in response to a SUBSCRIBE request has no KPML if there are no matching quarantined digits.

Example 10 shows a typical time-out response. Note the device reports the digits collected up to the timeout in the digits attribute of the response tag.

```
<?xml version="1.0" encoding="UTF-8"?>
<kpml xmlns="urn:ietf:params:xml:ns:kpml"
    xmlns:xsi="http://www.w3.org/2001/XMLSchema-instance"
    xsi:schemaLocation="urn:ietf:params:xml:ns:kpml kpml.xsd"
    version="1.0">
      <response code="423" text="Timer Expired" digits="1703555"/>
</kpml>
```

EXAMPLE 10

Sample Time-Out Response

If there are quarantined digits in the SUBSCRIBE request that match a pattern, then the NOTIFY message in response to the SUBSCRIBE request includes the appropriate KPML document.

Key presses collected using the disclosed method can contain sensitive information, such as PIN codes, credit card numbers, or other personal information. Thus notifications should be secure, integrity checked, and not accessible to unauthorized parties. Likewise, the end point device needs to authenticate subscriptions and make sure the subscriber is authorized to access the key press information. Moreover, subscriptions also need cryptographic integrity guarantees and need protection against spoofing and man-in-the-middle attacks.

A technology known as Transport Layer Security (TLS) can be used for transport security, and a separate technology known as S/MIME can be used for the SUBSCRIBE and NOTIFY methods to guarantee authentication, integrity, and non-repudiation.

Figure 6:
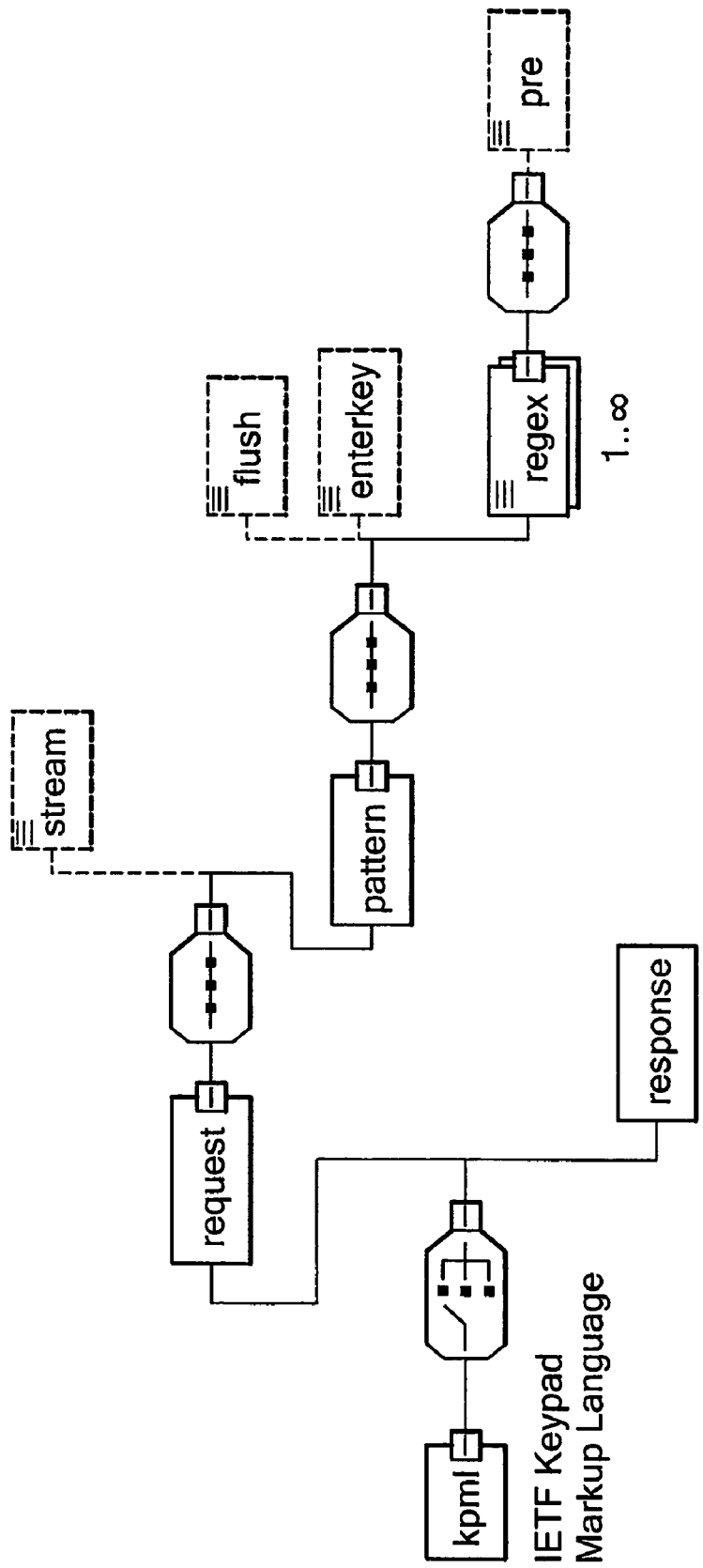
FIG. 6 is a diagram of a schema for a Key Press Markup Language (KPML) used in any of the systems shown in FIGS. 1-4.

Example 10 is an example of a schema that embodies the facets of the preferred embodiment as described herein. A graphical representation of this schema is in FIG. 6.

```
<?xml version="1.0" encoding="UTF-8"?>
<xs:schema targetNamespace="urn:ietf:params:xml:ns:kpml"
    xmlns="urn:ietf:params:xml:ns:kpml"
    xmlns:xs="http://www.w3.org/2001/XMLSchema"
    elementFormDefault="qualified"
    attributeFormDefault="unqualified">
    <xs:element name="kpml">
        <xs:annotation>
            <xs:documentation>IETF Keypad Markup
                Language</xs:documentation>
        </xs:annotation>
        <xs:complexType>
            <xs:choice>
                <xs:element name="request">
                    <xs:complexType>
                        <xs:sequence>
                            <xs:element name="stream" type="xs:string"
                                minOccurs="0"/>
                            <xs:element name="pattern">
                                <xs:complexType>
                                    <xs:sequence>
                                        <xs:element name="flush" minOccurs="0">
                                            <xs:complexType>
                                                <xs:simpleContent>
                                                    <xs:extension base="xs:string"/>
                                                </xs:simpleContent>
                                            </xs:complexType>
                                        </xs:element>
                                        <xs:element name="enterkey" minOccurs="0">
                                            <xs:complexType>
                                                <xs:simpleContent>
                                                    <xs:extension base="xs:string"/>
                                                </xs:simpleContent>
                                            </xs:complexType>
                                        </xs:element>
                                        <xs:element name="regex"
                                            maxOccurs="unbounded">
                                            <xs:complexType mixed="true">
                                                <xs:sequence>
                                                    <xs:element name="pre" minOccurs="0">
                                                        <xs:complexType>
                                                            <xs:simpleContent>
                                                                <xs:extension base="xs:string"/>
                                                            </xs:simpleContent>
                                                        </xs:complexType>
                                                    </xs:element>
                                                </xs:sequence>
                                                <xs:attribute name="tag" type="xs:string"
                                                    use="optional"/>
                                            </xs:complexType>
                                        </xs:element>
                                    </xs:sequence>
                                    <xs:attribute name="persistent" type="xs:boolean"
                                        use="optional"/>
                                    <xs:attribute name="interdigittimer"
                                        type="xs:integer"
                                        use="optional"/>
                                    <xs:attribute name="criticaldigittimer"
                                        type="xs:integer"
                                        use="optional"/>
                                    <xs:attribute name="extradigittimer"
                                        type="xs:integer"
                                        use="optional"/>
                                    <xs:attribute name="longtimer"
                                        type="xs:integer"
                                        use="optional"/>
                                    <xs:attribute name="longrepeat"
                                        type="xs:boolean"
                                        use="optional"/>
                                </xs:complexType>
                            </xs:element>
                        </xs:sequence>
                    </xs:complexType>
                </xs:element>
                <xs:element name="response">
                    <xs:complexType>
                        <xs:attribute name="code" type="xs:string"
                            use="required"/>
                        <xs:attribute name="text" type="xs:string"
```

-continued

```
            use="required"/>
        <xs:attribute name="suppressed" type="xs:boolean"
            use="optional"/>
        <xs:attribute name="forced_flush" type="xs:boolean"
            use="optional"/>
        <xs:attribute name="digits" type="xs:string"
            use="optional"/>
        <xs:attribute name="tag" type="xs:string" use="optional"/>
      </xs:complexType>
    </xs:element>
  </xs:choice>
  <xs:attribute name="version" type="xs:string" use="required"/>
  </xs:complexType>
  </xs:element>
</xs:schema>
```

EXAMPLE 10

Representative KPML Schema

Although in the foregoing description, the particular form of user input constitutes key presses from a telephone keypad, it will be appreciated that the disclosed system and method are also usable with other forms of user input and other devices. For example, the user input may constitute certain patterns of speech that can be recognized by speech recognition hardware/software and then made the subject of subscriptions and notifications as described above. The disclosed system and method may also be used with devices such as personal computers (PCs), personal digital assistants (PDAs), or other devices capable of accepting user input in the form of touches or strokes on a screen using a finger or a stylus. Additionally, the "user" generating the input need not be a human user, as in the case of a computer or other device generating key press tones or other user input in a manner mimicking the behavior of a human user.

Remotely Controlling a Device via a Communication Device

Figure 7:
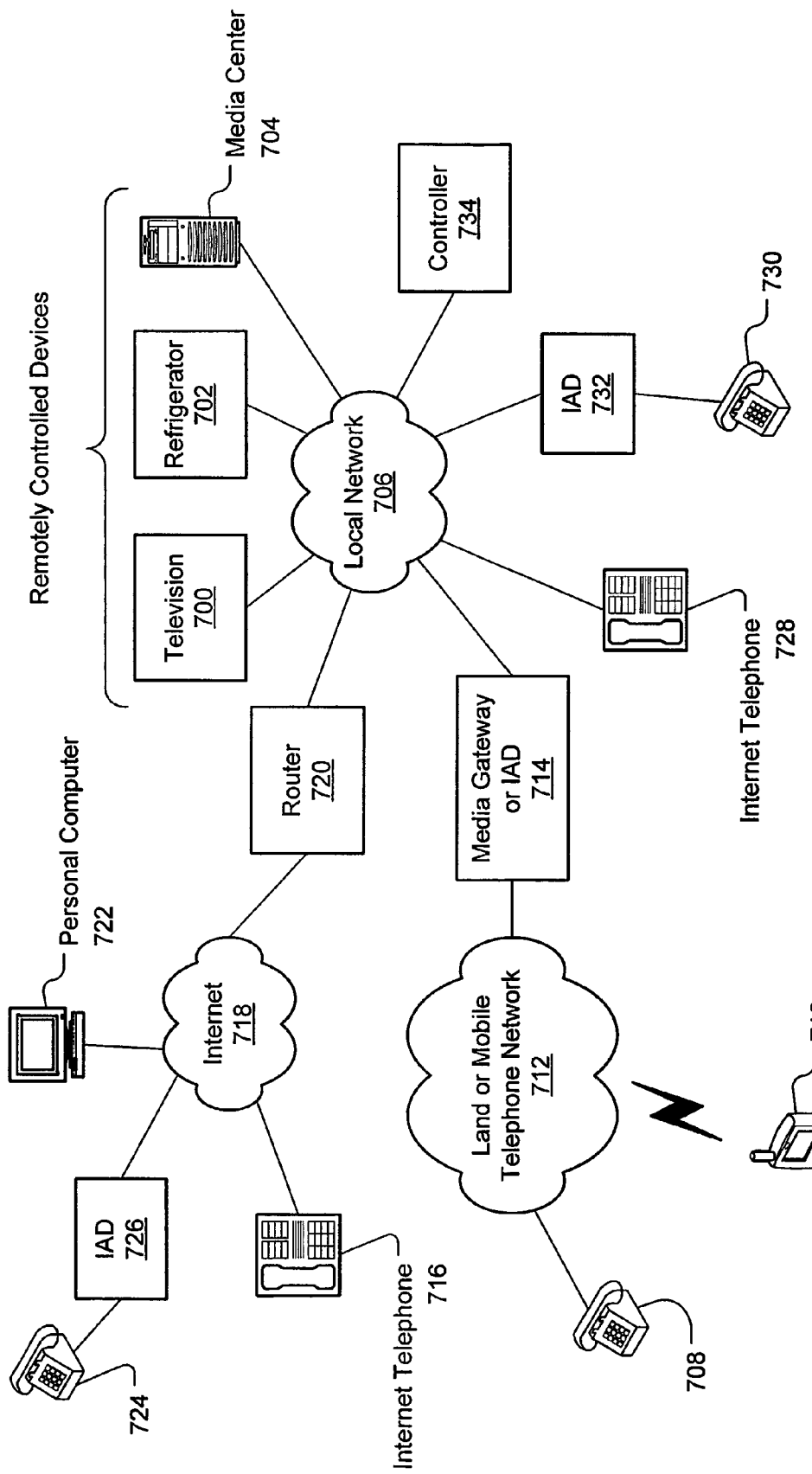
FIG. 7 is block diagram of the system for remotely controlling a device in accordance with the present invention.

FIG. 7 is a block diagram of a system for remotely controlling one or more premises devices, such as a television 700, a refrigerator 702, a media center 704, and/or other type of household, office or other type of devices, via a communication device. Other exemplary premises devices (not shown) that can be remotely controlled include an air-conditioner, a heater, a stove or other cooking appliance, a camera, an answering machine, a surveillance security system, and a personal computer. The remotely controlled devices 700-704 are connected to a local network 706, such as an Internet protocol (IP) local area network (LAN), for example an Ethernet network.

The local network 706 can be wired, wireless or a combination thereof. Many homes and offices are equipped with such local networks. Although FIG. 7 shows a single local network 706, the local network can include a combination of networks. For example, the local network 706 can include one or more short-range wireless networks, such as Bluetooth, 802.11b, 802.11g, etc., interconnected via appropriate bridges, routers, etc. Links between the remotely controlled devices 700-704 and the local network 706 can be wired or wireless.

Several non-limiting examples of communication devices are also shown in FIG. 7 and discuss the following paragraphs. The communication device can be a wired or wireless (such as cellular) telephone 708 or 710 connected to a land or mobile telephone network 712. If signals from the telephone 708 or 710 are carried over a conventional (i.e., non-packet-switched) telephone network, a media gateway, integrated access device (IAD) or other suitable telephone network gateway (collectively referred to as a media gateway) 714 is used to convert telephony signals, such as signaling (call setup, etc.) and sound (TDM, etc.) signals carried over the conventional telephone network, to and from telephony signals carried over an package-switched network, such as the local network 706, as is well known in the art. However, for purposes of the present invention, only a signaling path needs to be established, as will be described in more detail below. As used herein, "signaling" or "telephony signaling" means setup and control, such as tear-down, of a call, as distinct from the media (such as voice) signals of a call. Thus, the media gateway 714 can, but need not, be a subset of a conventional media gateway. The media gateway 714 can be located within the telephone network 712 or outside the telephone network, such as on the same premises as the remotely controlled devices 700-704, or anywhere between the telephone network and the premises.

The remotely controlled premises devices 700-704 are external to, and not part of, the telephone network 712. For example, the remotely controlled devices 700-704 are not telephone network elements, such as switches, intelligent peripherals or other telephone network elements that respond to signaling information, such as dialed telephone numbers.

The communication device can be an Internet telephone, such as a voice over IP (VoIP) telephone 716 connected directly (as shown) or indirectly, such as via a router (not shown), to the Internet 718. An example of a suitable Internet telephone 716 is a telephone that operates according the session initiation protocol (SIP). In the case of an Internet telephone 716, a media gateway is generally not necessary, because the signals from the Internet telephone are generally compatible with the local network 706. The local network 706 is connected to the Internet or another wide area network 718 via a router or other suitable device 720 to receive packets from the Internet telephone 716. A portion of the call can be carried over the Internet, another wide area network, a telephone network or a combination thereof.

The communication device can be a suitably configured personal computer 722 that is directly or indirectly connected to the Internet 718. The personal computer 722 executes software to enable a user to press simulated dial pad buttons and to place telephone calls over the Internet 718 in a manner similar to that used by the Internet telephone 716. Optionally, i.e., if the remotely controlled devices 700-704 are to respond to speech commands, the personal computer 722 includes a microphone (not shown). In addition, if voice prompts are to be played to the user, a personal computer 722 includes a speaker or headphones (not shown).

The communication device can be an analog telephone 724 connected via an LAD 726 to the Internet 718. A suitable IAD is available from Linksys, a division of Cisco Systems, Inc., Irvine, Calif. under the tradename Linksys WRT54GP2 Wireless-G Broadband Router. The analog telephone 724 can be located anywhere access to the Internet 718 is available. As noted above with respect to the media gateway 714, the IAD 726 converts signals from the analog telephone 724 to and from signals that can be transported over the Internet 718 to place telephone calls.

The communication devices discussed above are generally not located on the same premises as the remotely controlled devices 700-704. These communication devices, particularly the wireless telephone 710, can, however, also be advantageously used on the premises to control the remotely controlled devices 700-704. For example, the wireless telephone 710 can be used to: change the volume played or the channel displayed by the television 700; command the refrigerator 702 to dispense a beverage; or command the media center 704 to play a musical selection in an identified room of the premises.

Communication devices that are co-located with the remotely controlled devices 700-704 can also be used to remotely control the devices 700-704. For example, a local Internet telephone 728 connected to the local network 706 can be used to control the remotely controlled devices 700-704. In addition, a local analog telephone 730, connected via an LAD 732 to the local network 706, can control the remote controlled devices 700-704.

A controller 734 is connected to the local network 706 via a wired or wireless link. The controller 734 contains hardware and/or software to control operations of the remotely controlled devices 700-704 in response to user interactions with one of the communication devices 708, 710, 716, 722, 724, 728 or 730. The controller 734 communicates with the remotely controlled device 700-704 via the local network 706 to issue commands to the remotely controlled device and, optionally, to obtain status information from the remotely controlled device. The controller 734 can include a memory storing instructions and data and a processor to execute the instructions and to access and store the data, thereby performing the functions described herein. Alternatively, the controller 734 can be implemented with an application-specific integrated circuit (ASIC), field -programmable gate array (FPGA) or other suitable hardware, software or combination thereof.

In one embodiment, the controller 734 is separate from the remotely controlled devices 700 -704, as shown in FIG. 7. In another embodiment (not shown), the controller 734 is included in one or each of the remotely controlled devices 700-704. If a controller 734 is included in one of the remotely controlled devices 700-704, the controller can control only the device in which it is included, or the controller can control other devices 700-704 by communicating with the other devices via the local network 706.

The controller 734 also communicates via a telephony signaling path and according to a protocol, such as SIP, with the communication device or with another unit located between the communication device and the controller 734. The communication device places a telephone call to the premises or directly to the controller 734. Alternatively, the controller 734 places a telephone call to the communication device. In either case, a voice path need not be established from the communication device to the controller 734. Instead, a telephony signaling path is established, and information about user interactions with the communication device during the call, such as dial pad key presses, are sent over the signaling path to the controller 734.

The controller 734 interprets the user interactions and issues corresponding commands to the remotely controlled devices 700-704. For example, pressing the star "*" key on the telephone causes the controller 734 to increase the volume of audio played by the television 700, and pressing a sequence of digit keys followed by the pound "#" key causes the controller 734 to change the channel displayed by the television 700 to a channel identified by the sequence of pressed digit keys. If more than one remotely controlled device 700-704 is controlled by a single controller 734, the user interaction includes one or more button presses to identify which remotely controlled device(s) is(are) the target(s) of the command. In one embodiment, each command includes an identification of the target remotely controlled device(s) 700-704.

In another embodiment, the controller 734 accepts a command to identify one or more of the remotely controlled devices 700 -704, thereby establishing a "context," and subsequent commands are interpreted as being directed to the selected device(s) until a different context is established.

If the communication device, such as the Internet telephone 716 or 728 or the personal computer 722, is capable of communicating according to the signaling protocol, the controller 734 communicates directly with the communication device. In one embodiment, the Internet telephone 716 or 728 or the personal computer 722 places a call to the controller's 734 address. This address can indicate which remotely controlled device 700-704 is to be controlled. An example address is SIP:MyTV@EricsHouse.Adelphia.net. Once the call is established, information about user interactions with the communication device, such as keypad button presses, strokes on a touch -sensitive screen, etc., are sent to the controller 734 as packets in the signaling path. No voice path needs to be established between the communication device in the controller 734. Consequently, the controller 734 need not include DTMF detection hardware or software, nor a protocol stack to support RTP.

During a voice call, voice signals are exchanged between SIP or similar devices as a series of compressed (encoded) samples, such as according to RTP. When a SIP or similar called device receives an invitation to participate in a call, the called device responds with a list of encoding types the called device is prepared to accept. Essentially, this list represents the types of compressor-decompressors (CODECs) included in the called device. In one embodiment, when the controller 734 receives an invitation to participate in the call, the controller 734 responds with a message indicating that the controller 734 is not prepared to accept any type of compressed signals. Consequently, no audio path is established to the controller 734. Alternatively, the calling communication device can request setup of the call without an audio path.

On the other hand, as noted above, if a communication device, such as a "plain old telephone service" (POTS) telephone 724 or 730, is not capable of communicating according to the signaling protocol, the communication device is connected to an IAD 726 or 732, which supports such a signaling protocol and performs appropriate conversions. In this case, the IAD 726 or 732 performs DTMF detection. Thus, if the user presses one or more key pad buttons, the IAD 726 or 732 detects the generated DTMF tones and sends messages in packets over the signaling channel of the Internet 718 and/or the local network 706 to the controller 734 to notify the controller of the user interactions with the communication device.

Similarly, if a telephone 708 or 710 or other communication device is connected to the telephone network 712, and a call placed by such a communication device is carried over the telephone network 712 such that information about user interactions is carried only in-band, the call is routed through the media gateway 714. As noted, the media gateway 714 can be located within the telephone network 712, on the premises with the remotely controlled devices 700, 702, 704 or elsewhere. The media gateway 714 performs DTMF detection and sends messages in packets over the signaling channel of the telephone network 712 and/or the local network 706 to the controller 734 to notify the controller of the user interactions with the communication device. If several telephone numbers are used for several controlled devices 700, 702, 704, or if several telephone numbers are used for voice communication, fax, controlling devices, and/or other purposes, the media gateway 714 can use dialed number identification service (DNIS) information provided by the telephone network 712 to identify the purpose of a call or to identify a particular device that is to be controlled. If a device is to be controlled, the media gateway can pass this information to the controller 734.

Thus, the communication device can control the remotely controlled device 700-704 without the need to establish a voice path, and without requiring a DTMF detector or RTP protocol stack in the controller 734. Instead, the communication device places a call. The call is established, including establishing a telephony signaling path, such as over at least part of the telephone network 712, the Internet 718 and/or the local network 706, to carry at least one telephony signaling packet generated as a result of the user interaction with the communication device during the call, and the communication device controls the remotely controlled device solely via the at least one telephony signaling packet carried over the telephony signaling path.

Optionally, an audio path is established from the controller 734 to the communication device so that the controller can play one or more audio prompts to the user. This audio path extends over a portion of the local network 706, the telephone network 712, and/or the Internet 718, as appropriate, depending on the location of the communication device and/or an IAD or media gateway (if used). However, the controller 734 need not include a full RTP protocol stack to support the playing of audio prompts. For example, the controller 734 need not include an RTP protocol stack for incoming audio, unless the controller 734 is also controllable by speech. (If the controller 734 is controllable by speech, the controller includes appropriate speech recognition hardware and/or software.) In addition, the controller 734 can include simplified RTP support for outgoing prompts. For example, the controller 734 stores prompts in a format, such as in a file according to G.711, suitable for sending to a rendering device. Playing the prompt simply involves sending the contents of the file as a series of RTP packets with monotonically increasing sequence numbers in the RTP headers. Furthermore, the controller 734 can ignore feedback, such as feedback regarding network congestion.

To prevent unauthorized control of the devices 700-704, the controller 734 can employ an authentication mechanism, such as requiring the user to enter a passcode. For example, the user can enter the passcode as a sequence of key presses, and the controller 734 can check the passcode represented by the signaling packets sent as a result of the key presses. Alternatively, the Internet telephone 716 or 728 can be configured with authentication information. In this case, the Internet telephone 716 or 728 provides this authentication information to the controller 734, thereby obviating the need for the user to identify or authenticate him/herself. Advantageously, the user can disconnect the Internet telephone 728, remove it from the premises, and reconnect the Internet telephone 728 anywhere an Internet connection is available. In this case, the controller 734 continues to identify the Internet telephone 728 and recognize the user as being authenticated. Consequently, the Internet telephone 728 becomes a physical "token," and possession of the token enables the user to control the remotely controlled devices 700-704 without entering a passcode.

Similarly, the IAD 732 can be configured with authentication information. In this case, a user of the local POTS telephone 730 need not enter a passcode to control the remotely controlled devices 700-704.

The media gateway 714 typically cannot be configured with authentication information. However, the media gateway 714 receives caller identification information, and the media gateway 714 can pass that identification information to the controller 734.

In another embodiment, if the mobile telephone 710 includes a subscriber identity module (SIM) (not shown), an IP multimedia subsystem (IMS) (not shown) can interrogate the SIM to ascertain the identity of the user of the mobile telephone 710, and the IMS can then provide this identity information to the controller 734.

The controller 734 uses the Key Press Markup Language (KPML), as described above, or another suitable protocol to request notification from the communication device, IAD or media gateway, as appropriate, of user interactions with the communication device. Thus, the controller 734 corresponds to the application server 46 or 48 or to the aggregation server 54 shown in FIG. 4. Similarly, the communication device (if the communication device is capable of SIP signaling) or the IAD or media gateway or other device that receives DTMF signals from the communication device corresponds to the end point 50 in FIG. 4. If the controller 734 controls several remotely controlled devices 700-704, the controller can appear as several application servers, one corresponding to each of the remotely controlled devices. Furthermore, as noted above, other application servers (such as other controllers (not shown) for controlling remotely controlled devices or other application servers (not shown) unrelated to remotely controlled devices) can register with the end point to receive notifications of user interactions with the communication device.

While the invention is described through the above-described exemplary embodiments, it will be understood by those of ordinary skill in the art that modifications to, and variations of, the illustrated embodiments may be made without departing from the inventive concepts disclosed herein. Moreover, while the preferred embodiments are described in connection with various illustrative data structures, one skilled in the art will recognize that the system may be embodied using a variety of data structures. Accordingly, the invention should not be viewed as limited, except by the scope and spirit of the appended claims.

What is claimed is:

1. A method of remotely controlling a remotely controlled device via a communication device, the communication device being communicably coupled to a network, the remotely controlled device being external to the network, the method comprising the steps of:
   generating a subscription message by a controller communicably coupled to the network, the subscription message conforming to a session based protocol and specifying a pattern of user input upon whose occurrence the controller is to be notified;
   sending the subscription message from the controller to the communication device over the network using the session based protocol;
   monitoring, at the communication device, a user input for the occurrence of the specified pattern of user input in the subscription message;
   responsive to a user interaction with the communication device that includes the specified pattern of user input, notifying the controller of the occurrence of the specified pattern of user input, including:
      placing, by the communication device, a call to the controller over the network;
      establishing the call, including establishing a telephony signaling path between the communication device and the controller, the communication device and the controller being operative to communicate with one another over the telephony signaling path using the session based protocol;

generating a plurality of telephony signaling packets containing a notification of the user interaction with the communication device, the notification conforming to the session based protocol, the telephony signaling path being operative to carry the plurality of telephony signaling packets containing the notification of the user interaction with the communication device; and sending the plurality of telephony signaling packets containing the notification of the user interaction with the communication device from the communication device to the controller over the telephony signaling path using the session based protocol;

responsive to the notification contained in the plurality of telephony signaling packets, controlling the remotely controlled device by the controller; and otherwise, responsive to a user interaction with the communication device that includes a pattern of user input that is different from the specified pattern of user input, refraining from notifying the controller of the user interaction with the communication device, wherein the subscription message optionally includes a persistence indicator indicating that the communication device is to notify the controller of each of multiple occurrences of the specified pattern of user input in the subscription message, and wherein the method further comprises, at the communication device:

determining whether the persistence indicator is included in the subscription message;

if the persistence indicator is included in the subscription message, repeating the monitoring of the user input and the notifying of the controller for at least one subsequent occurrence of the specified pattern of user input in the subscription message, and if the persistence indicator is not included in the subscription message, ceasing the monitoring of the user input upon a first notification of the controller that the specified pattern of user input has occurred in the subscription message.

2. The method of claim 1, wherein establishing the call comprises avoiding establishing an audio path for the call.

3. The method of claim 1, further comprising:
establishing an audio path to the communication device; and
sending at least one audio prompt via the audio path to the communication device.

4. The method of claim 3, wherein establishing the audio path comprises establishing at least a portion of the audio path over the network.

5. The method of claim 3, wherein the network includes a public wide area network, and wherein establishing the audio path comprises establishing at least a portion of the audio path over the public wide area network.

6. The method of claim 3, wherein establishing the audio path comprises establishing at least a portion of the audio path over the Internet.

7. The method of claim 3, wherein the network includes a private local area network, and wherein establishing the audio path comprises establishing at least a portion of the audio path over the private local area network.

8. The method of claim 1, wherein the network includes a telephone network, and wherein establishing the telephony signaling path comprises establishing at least a portion of the telephony signaling path over the telephone network.

9. The method of claim 1, wherein the network includes a public wide area network, and wherein establishing the telephony signaling path comprises establishing at least a portion of the telephony signaling path over the public wide area network.

10. The method of claim 1, wherein establishing the telephony signaling path comprises establishing at least a portion of the telephony signaling path over the Internet.

11. The method of claim 1, wherein the network includes a private local area network, and wherein establishing the telephony signaling path comprises establishing at least a portion of the telephony signaling path over the private local area network.

12. The method of claim 1, wherein establishing the telephony signaling path comprises establishing at least a portion of the telephony signaling path between the communication device and the controller, the controller being external to the remotely controlled device.

13. The method of claim 1, wherein the network includes a telephone network, and wherein establishing the telephony signaling path comprises establishing at least a portion of the telephony signaling path between an element within the telephone network and the controller, the controller being external to the remotely controlled device.

14. The method of claim 1, wherein the network includes a telephone network, and wherein establishing the telephony signaling path comprises establishing at least a portion of the telephony signaling path between a telephone network gateway and the controller, the controller being external to the remotely controlled device.

15. The method of claim 1, wherein establishing the telephony signaling path comprises establishing at least a portion of the telephony signaling path between an integrated access device and the controller, the controller being external to the remotely controlled device.

16. The method of claim 1, wherein the communication device is an analog telephone.

17. The method of claim 1, wherein the communication device is a VoIP telephone.

18. The method of claim 1, wherein the communication device is a personal computer.

19. The method of claim 1, wherein:
the communication device comprises a touch-sensitive screen; and
the user interaction comprises at least one touch or stroke on the touch-sensitive screen.

20. The method of claim 1, wherein the user interaction comprises at least one key press.

21. The method of claim 1, wherein the user interaction comprises speech.

22. The method of claim 1, wherein the user interaction is provided by a human user.

23. The method of claim 1, wherein the user interaction is provided by a computer.

24. The method of claim 1 wherein the session based protocol is the Session Initiation Protocol (SIP).

25. The method of claim 1 wherein the generating of the subscription message by the controller includes generating the subscription message by the controller comprising an application server.

26. The method of claim 25 wherein the generating of the subscription message includes generating, by the application server, the subscription message using a predetermined key press markup language.

27. A system for remotely controlling a remotely controlled device, comprising:

a network;

a controller communicably connected to the network, the controller being operative to control the remotely controlled device, wherein the remotely controlled device is external to the network; and a communication device communicably connected to the network, wherein the controller is operative:

to generate a subscription message conforming to a session based protocol and specifying a pattern of user input upon whose occurrence the controller is to be notified; and to send the subscription message to the communication device over the network using the session based protocol, wherein the communication device is operative:

to monitor a user input for the occurrence of the specified pattern of user input specified in the subscription message;

responsive to a user interaction with the communication device that includes the specified pattern of user input, to notify the controller of the occurrence of the specified pattern of user input, including:

to place a call to the controller over the network, thereby establishing a telephony signaling path between the communication device and the controller, the communication device and the controller being operative to communicate with one another over the telephony signaling path using the session based protocol;

to generate a plurality of telephony signaling packets containing a notification of the user interaction with the communication device, the notification conforming to the session based protocol, the telephony signaling path being operative to carry the plurality of telephony signaling packets containing the notification of the user interaction with the communication device; and to send the plurality of telephony signaling packets containing the notification of the user interaction with the communication device to the controller over the telephony signaling path using the session based protocol, wherein, responsive to the notification contained in the plurality of telephony signaling packets, the controller is further operative to control the remotely controlled device, and wherein the communication device is further operative, otherwise, in response to a user interaction with the communication device that includes a pattern of user input that is different from the specified pattern of user input, to refrain from notifying the controller of the user interaction with the communication device, wherein the subscription message optionally includes a persistence indicator indicating that the communication device is to notify the controller of each of multiple occurrences of the specified pattern of user input in the subscription message, and wherein the communication device is further operative:

to determine whether the persistence indicator is included in the subscription message;

if the persistence indicator is included in the subscription message, to repeat the monitoring of the user input and the notifying of the controller for at least one subsequent occurrence of the specified pattern of user input in the subscription message, and if the persistence indicator is not included in the subscription message, to cease the monitoring of the user input upon a first notification of the controller that the specified pattern of user input has occurred in the subscription message.

28. The system of claim 27, wherein, to place the call, the communication device is operative to establish a telephony signaling path over the network for the call and to avoid establishing an audio path over the network for the call.

29. The system of claim 27, wherein the controller is operative to:

establish an audio path over the network to the communication device; and play at least one audio prompt over the audio path.

30. The system of claim 27, wherein the network includes at least a portion of the Internet.

31. The system of claim 27, wherein the network includes at least a portion of a telephone network.

32. The system of claim 27, wherein the network includes at least a portion of the Internet and a telephone network.

33. The system of claim 27, wherein the communication device comprises a VoIP telephone.

34. The system of claim 27, wherein the communication device comprises a personal computer.

35. The system of claim 27, wherein the communication device comprises a touch-sensitive screen and the user interaction comprises at least one touch or stroke on the touch-sensitive screen.

36. The system of claim 27, wherein the user interaction comprises at least one key press.

37. The system of claim 27, wherein the user interaction comprises speech.

38. The system of claim 27, wherein the network includes a local network, and wherein the controller is operative to control the remotely controlled device via the local network.

39. The system of claim 27 wherein the session based protocol is the Session Initiation Protocol (SIP).

40. The system of claim 27 wherein the controller comprises an application server.

41. The method of claim 40 wherein the application server is operative to generate the subscription message using a predetermined key press markup language.

42. A system for remotely controlling a remotely controlled device, comprising:

a network;

a controller communicably connected to the network, the controller being operative to control the remotely controlled device, the remotely controlled device being external to the network;

a communication device communicably connected to the network; and a gateway having an associated subscription device, the gateway and the subscription device being communicably connected between the communication device and the controller, the gateway, the subscription device, and the controller being operative to communicate with one another using a session based protocol, wherein the controller is operative:

to generate a subscription message conforming to the session based protocol and specifying a pattern of user input upon whose occurrence the controller is to be notified; and to send the subscription message to the subscription device over the network using the session based protocol, wherein the subscription device is operative:

to monitor a user input at the communication device for the occurrence of the pattern of user input specified in the subscription message; and responsive to a user interaction with the communication device that includes the specified pattern of user input, to generate a notification of the user interaction with the communication device, the notification conforming to the session based protocol, wherein, responsive to the user interaction with the communication device that includes the pattern of user input, the communication device is operative to notify the controller of the occurrence of the specified pattern of user input, including:

to place a call to the controller over the network;

to generate at least one signal relating to the user interaction with the communication device; and to send the at least one signal in-band to the gateway over the network;

wherein the gateway is further operative:

to receive the at least one signal from the communication device;

to receive the notification of the user interaction from the subscription device;

responsive to receiving the at least one signal from the communication device and the notification of the user interaction from the subscription device, to generate a plurality of telephony signaling packets containing the notification of the user interaction; and to send the plurality of telephony signaling packets containing the notification of the user interaction out-of-band to the controller using the session based protocol, wherein, responsive to the notification of the user interaction contained in the plurality of telephony signaling packets, the controller is further operative to control the remotely controlled device, and wherein the subscription device is further operative, otherwise, in response to a user interaction with the communication device that includes a pattern of user input that is different from the specified pattern of user input, to refrain from notifying the controller of the user interaction with the communication device, wherein the subscription message optionally includes a persistence indicator indicating that the subscription device is to notify the controller of each of multiple occurrences of the specified pattern of user input in the subscription message, and wherein the subscription device is further operative:

to determine whether the persistence indicator is included in the subscription message;

if the persistence indicator is included in the subscription message, to repeat the monitoring of the user input and the notifying of the controller for at least one subsequent occurrence of the specified pattern of user input in the subscription message, and if the persistence indicator is not included in the subscription message, to cease the monitoring of the user input upon a first notification of the controller that the specified pattern of user input has occurred in the subscription message.

43. The system of claim 42, wherein, to generate the plurality of telephony signaling packets, the gateway is operative to establish a telephony signaling path and to avoid establishing an audio path.

44. The system of claim 42, wherein the controller is operative to:

establish an audio path to the gateway; and play at least one audio prompt over the audio path.

45. The system of claim 42, wherein the network includes a local network, and wherein the controller is operative to control the remotely controlled device via the local network.

46. The system of claim 42, wherein the gateway includes the associated subscription device.

47. The system of claim 42, wherein the gateway is distinct from the associated subscription device.

48. The system of claim 42 wherein the session based protocol is the Session Initiation Protocol (SIP).

49. The system of claim 42 wherein the controller comprises an application server.

50. The method of claim 49 wherein the application server is operative to generate the subscription message using a predetermined key press markup language.

* * * * *